United States Patent
Ng et al.

(10) Patent No.: US 12,417,752 B2
(45) Date of Patent: Sep. 16, 2025

(54) COORDINATED MULTI-VIEW DISPLAY EXPERIENCES

(71) Applicant: Misapplied Sciences, Inc., Redmond, WA (US)

(72) Inventors: Albert H. Ng, Redmond, WA (US); Paul H. Dietz, Redmond, WA (US); David S. Thompson, Redmond, WA (US)

(73) Assignee: MISAPPLIED SCIENCES, INC., Redmond, WA (US)

(*) Notice: Subject to any disclaimer, the term of this patent is extended or adjusted under 35 U.S.C. 154(b) by 907 days.

(21) Appl. No.: 15/621,846

(22) Filed: Jun. 13, 2017

(65) Prior Publication Data

US 2018/0357981 A1    Dec. 13, 2018

(51) Int. Cl.
G09G 5/14         (2006.01)
G06F 3/14         (2006.01)
G06K 7/10         (2006.01)
G06Q 30/0251      (2023.01)
G06Q 30/0601      (2023.01)
G06V 40/10        (2022.01)
G06V 40/16        (2022.01)
G09G 5/12         (2006.01)

(52) U.S. Cl.
CPC ............ *G09G 5/14* (2013.01); *G06F 3/1423* (2013.01); *G06K 7/10009* (2013.01); *G06Q 30/0269* (2013.01); *G06Q 30/0641* (2013.01); *G06V 40/103* (2022.01); *G09G 5/12* (2013.01); *G06V 40/172* (2022.01); *G09G 2320/0261* (2013.01); *G09G 2320/08* (2013.01); *G09G 2320/10* (2013.01); *G09G 2354/00* (2013.01); *G09G 2370/022* (2013.01); *G09G 2380/06* (2013.01)

(58) Field of Classification Search
None
See application file for complete search history.

(56) References Cited

U.S. PATENT DOCUMENTS

| | | | |
|---|---|---|---|
| 6,069,650 A * | 5/2000 | Battersby | G02F 1/29 348/E13.043 |
| 7,462,104 B2 | 12/2008 | Di Cesare | |
| 8,461,995 B1 | 6/2013 | Thornton | |
| 2003/0115096 A1 | 6/2003 | Reynolds et al. | |
| 2005/0093986 A1 | 5/2005 | Shinohara et al. | |
| 2008/0004950 A1 * | 1/2008 | Huang | G06Q 30/02 705/14.67 |

(Continued)

OTHER PUBLICATIONS

Copenheaver; International Search Report and Written Opinion of PCT Application No. PCT/US2018/037261; Oct. 12, 2018; 14 pgs.

*Primary Examiner* — Michael J Sittner
(74) *Attorney, Agent, or Firm* — Seed IP Law Group LLP

(57) ABSTRACT

A multi-view (MV) system with multiple MV displays utilizes state information to assign personalized versions of content to display to viewers, thereby providing a coordinated MV display experience. These systems may include a sensing system for detecting viewers and other environmental conditions, and a controller to manage the content assignments for the MV displays. The controller can manage the viewer states, viewer state transitions, and content assignment changes based on changes of those viewers and conditions. The systems can be utilized to simultaneously present coordinated and personalized content to multiple viewers of multiple MV displays.

28 Claims, 15 Drawing Sheets

(56) References Cited

U.S. PATENT DOCUMENTS

| | | |
|---|---|---|
| 2009/0109126 A1 | 4/2009 | Stevenson et al. |
| 2011/0159929 A1 | 6/2011 | Karaoguz |
| 2012/0019670 A1* | 1/2012 | Chang ............... H04N 9/3194 |
| | | 348/189 |
| 2012/0140048 A1 | 6/2012 | Levine |
| 2014/0320616 A1 | 10/2014 | Levine |
| 2015/0092026 A1 | 4/2015 | Baik et al. |
| 2015/0279321 A1* | 10/2015 | Falconer ............. G06Q 30/02 |
| | | 345/589 |
| 2016/0026253 A1* | 1/2016 | Bradski ............... H04N 13/128 |
| | | 345/8 |
| 2016/0150223 A1* | 5/2016 | Hwang ............... H04N 13/324 |
| | | 348/51 |
| 2016/0261837 A1 | 9/2016 | Thompson et al. |
| 2016/0261856 A1 | 9/2016 | Ng et al. |
| 2016/0293003 A1 | 10/2016 | Ng et al. |
| 2016/0345001 A1 | 11/2016 | Baek et al. |
| 2016/0364087 A1 | 12/2016 | Thompson et al. |
| 2017/0085867 A1* | 3/2017 | Baran ................... B41M 3/008 |
| 2017/0205889 A1 | 7/2017 | Ng et al. |

\* cited by examiner

COORDINATED MULTI-VIEW DISPLAY EXPERIENCES

FIELD

This application relates to electronic displays.

BACKGROUND

Retail, entertainment, and other types of venues are striving to incorporate personalized experiences for guests to improve the hospitality of the environment, improve customer service, or drive consumer behavior. However, when there are multiple guests in a particular location, it can be challenging to provide a personalized experience for each guest without detracting from the experiences of the other guests in the location. It is also challenging to continue providing personalized experiences to guests as they travel around a larger venue.

SUMMARY

Systems and methods are described for providing coordinated multi-view display experiences. In accordance with some embodiments, a method of operating a plurality of multi-view (MV) displays, wherein each MV display is associated with a corresponding viewing area and is configured to display differentiated visual content to a plurality of viewing zones in the corresponding viewing area is provided. The method comprises: identifying a first target in a first viewing area associated with a first MV display of the plurality of MV displays; displaying, by the first MV display, a first visual content to a first viewing zone associated with the first target; determining the first target's presence in a second viewing area associated with a second MV display of the plurality of MV displays; determining a first state associated with the first target; assigning a second visual content for display based on the determined first state associated with the first target; and displaying, by the second MV display, the second visual content to a second viewing zone associated with the first target.

In accordance with other embodiments, a display system is provided, comprising: a first multi-view (MV) display configured to simultaneously display a first visual content visible from a first viewing zone and a second visual content visible from a second viewing zone, wherein the first visual content is not visible from the second viewing zone and the second visual content is not visible from the first viewing zone; a second MV display configured to simultaneously display a third visual content visible from a third viewing zone and a fourth visual content visible from a fourth viewing zone, wherein the third visual content is not visible from the fourth viewing zone and the fourth visual content is not visible from the third viewing zone; a sensing system configured to detect one or more features of a first target in the first viewing zone; and a system controller configured to maintain state information relating to the first target and to assign first visual content for display to the first viewing zone of the first MV display based on the state information relating to the first target.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention.

DETAILED DESCRIPTION

Figure 1A:
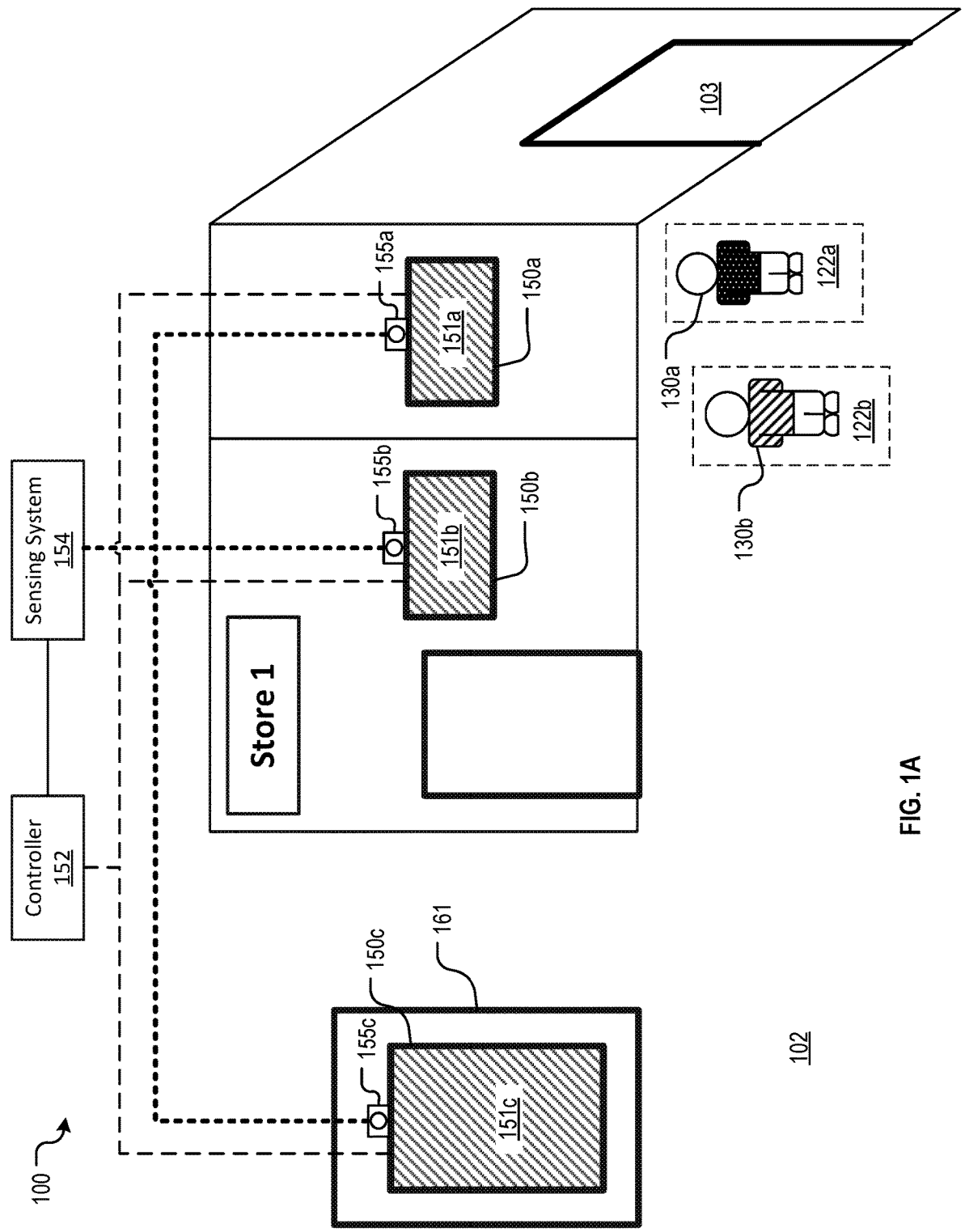
FIGS. 1A-1B illustrate an example installation of a multi-view (MV) display system for displaying targeted content on a plurality of MV displays, in accordance with embodiments of the present invention.

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for operating a plurality of multi-view (MV) displays and providing coordinated MV display experiences. These systems may include a sensing system for detecting viewers and other environmental conditions, and a controller to manage the content assignments for the plurality of MV displays. The controller can manage the viewer states, viewer state transitions, and content assignment changes based on changes of those viewers and conditions. The systems can be utilized to present coordinated content to a plurality of viewers of the plurality of MV displays.

A typical electronic display, such as an LCD, LED, or plasma display, shows a single image at a time to all viewable locations of the display. In a viewing area shared by multiple viewers, each viewer simultaneously sees the same image on the display. As a result, the image on the display cannot be simultaneously customized to multiple viewers of the display. Content is either selected to be suitable to all viewers, or customized to a subset of viewers at the expense of being less relevant to the remainder of viewers.

MV displays, on the other hand, can simultaneously show multiple versions of content, with each version targeted to specific people or zones within the total viewing area of the MV display. The MV display may comprise, e.g., projection elements that can each controllably shine light of different color and brightness in many different directions. This allows multiple viewers in the same shared viewing area to each see different versions of content simultaneously on the same display. With such a display, content can be customized for each individual viewer, at the same time, and on the same shared display. To show personalized versions of content to individual viewers, the system may utilize predefined viewing zones and a detection system for identifying viewers and their corresponding viewing zone locations. The system can then display targeted versions of content to each viewing zone, depending on the identified viewers in that zone. Alternatively, instead of using predefined, fixed-location viewing zones, the system may first identify viewers and their corresponding locations relative to the MV display, and then define viewing zones at the locations of the viewers. The system can track the viewers' movement around the environment, and update each viewing zones in real time to follow the corresponding viewer's movement.

The multi-view functionality, while allowing different experiences for different viewers or viewing zones, can make the display more challenging for a user to control than a traditional single-view display. In addition to designing different versions of content for display, the recipients of each version of content must also be defined. For example, a user may specify viewers and/or viewing zones within the viewing area of the display and assign a version of content to each viewer and/or viewing zone. For a system including multiple MV displays, the process of establishing one or more viewing zones for each individual MV display and assigning a version of content to be shown to each viewing zone can be laborious. In addition to tracking the physical locations of each viewer, it may be desirable to track the state of each viewer so that the display of the personalized content on each MV display be directed to each individual viewer based on the determined viewer state. This may be accomplished using a system of MV displays and sensors that detect characteristics or identities of guests and provide personalized or targeted content on those MV displays for the guests. For example, a sensing system may identify characteristics of the multiple viewers, and based on those identified characteristics for each viewer, generate content tailored to each viewer for display on the MV display. Multiple MV displays can be networked together, such that actions by a viewer detected when the viewer is located near a first MV display can affect the content shown to that viewer on other MV displays as the viewer moves around a venue and passes each new MV display. These techniques can be used to improve viewer engagement as the viewers travel through the venue.

Figure 1B:
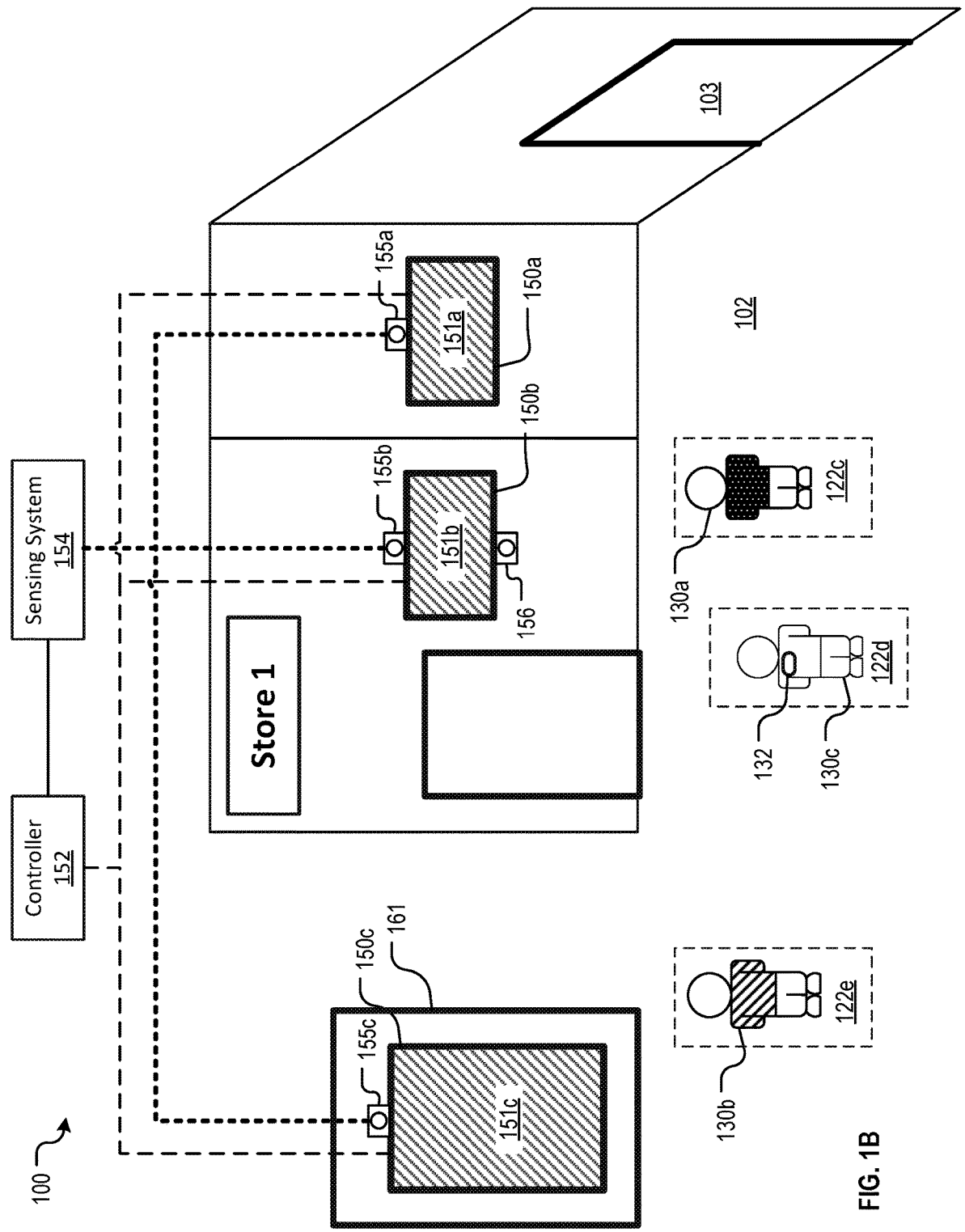

FIGS. 1A-1B illustrate an example installation of an MV display system for displaying targeted and/or coordinated content on a plurality of MV displays in a shared viewing environment, in accordance with an embodiment of the present disclosure. In the illustrated example, the environment 102 is a shopping mall and the MV display system 100 includes a system controller 152 operatively coupled to a plurality of MV displays 150a-150c positioned throughout the shopping mall environment 102. Each MV display 150a-150c includes a viewing surface 151a-151c and is configured to display differentiated versions of content to viewers within the environment 102. Each MV display 150 has an associated viewing area including one or more different viewing zones. The MV displays 150 are configured to display a different version of content visible to viewers in each viewing zone. The MV display system 100 may also include a sensing system 154, which includes a plurality of sensing devices 155a-155c. Each sensing device 155a-155c is positioned adjacent to a corresponding MV display 150a-150c, and is configured to determine features or characteristics of targets in the viewing area in view of the corresponding MV display 150a-150c. In the illustrated example, the sensing devices 155a-155c comprise cameras and the sensing system 154 comprises a machine/computer vision viewer detection system that captures images or videos within the shopping mall environment 102. The captured images/videos are then used to determine one or more characteristics of the viewing area and the viewers positioned in the viewing location, as will be described in greater detail below.

FIG. 1A depicts two shoppers 130a-130b who have just entered the shopping mall environment 102 and are walking past a first MV display 150a and corresponding sensing device 155a, which captures images of two targets entering the shopping mall environment 102 through the entrance 103. The machine vision component of the sensing system 154 may use a facial recognition system to determine the identities of the two targets 130a-130b as known shoppers who have previously registered with a membership with the shopping mall 102. The controller 152 is then able to retrieve information about those shoppers 130a-130b from a shopping mall membership database. This information may include various characteristics of those shoppers 130a-130b, such as, e.g., their names, home addresses, past shopping history, and shopping preferences or interests.

In the illustrated embodiment, the first MV display 150a serves as an initial greeting screen for shoppers entering through the mall entrance 103. A unique viewing zone 122 can be established for each shopper who enters the mall 102 so that the first MV display 150 can display different versions of content to each shopper as those shoppers pass through the viewing area of the first MV display 150. In the illustrated example, the first shopper 130a is identified by the sensing system 154 and the shopper's name is retrieved from the shopping mall membership database. A first viewing zone 122a is established at the location of the first shopper 130a so that when the first shopper 130a looks at the viewing surface 151a of the first MV display 150a, the first shopper 130a will see a personalized greeting, such as, e.g., "Welcome back, Bob!"

In one example, the second target 130b is not registered with the shopping mall membership database. As a result, the sensing system 154 is unable to retrieve any information relating to the target 130b because no information about the target 130b is available to the system 100. Nevertheless, the sensing system 154 can identify visual characteristics or other unique identifiers for the second target 130b so that when other sensing devices 155 capture images of the second target 130b as the shopper walks throughout the mall environment 102, the sensing system 154 can recognize the second target 130*b* and distinguish the second target 130*b* from the other shoppers nearby. A second unique viewing zone 122*b* can be established at the location of the second target 130*b* so that a differentiated version of content can be displayed to the second target 130*b* on the first MV display 150*a*. Because the second target 130*b*'s name is unknown, the first MV display 150 is unable to display a personalized greeting like the one displayed to the first shopper 130*a*. Instead, a generic greeting, such as, e.g., "Welcome to our mall!" can be displayed by the first MV display 150*a* to the second viewing zone 122*b*. As a result, the first MV display 150*a* is able to display unique and personalized messages to different shoppers simultaneously looking at the same first MV display 150.

The MV display system 100 is also configured to maintain state information about each of the targets 130 as they travel through the shopping mall environment 102. Various types of state information can be stored for each target 130, as will be described in greater detail below. In the embodiment illustrated in FIGS. 1A-1B, the recorded state information can include, e.g., the stores visited by the shoppers 130, the routes taken by the shoppers 130 as they move through the mall environment 102, items in which the shoppers 130 have shown an interest, and the purchases made by the shoppers 130 at the various stores in the mall environment 102.

FIG. 1B shows the shopping mall environment 102 after some period of time has passed from the situation illustrated in FIG. 1A. The first shopper 130*a* has walked through the mall environment 102 and is standing in front of Store 1, which includes a second MV display 150*b* and a second sensing device (e.g., digital camera) 155*b* in its storefront. The second sensing device 155*b* captures images of the first shopper 130*a* as the first shopper 130*a* enters the viewing area of the second MV display 150*b*. The sensing system 154 then identifies the first shopper 130*a* based on the detected features or characteristics captured by the sensing device 155*b*. The system controller 152 can retrieve the stored state information about the first shopper 130*a* and utilize that state information, along with other information, in order to determine what content to display to the viewing zone 122*c* in which the first shopper 130*a* is currently positioned.

In one example, the state information about the first shopper 130*a* may include a list of stores the first shopper 130*a* has visited since arriving at the mall environment 102. The system 100 can then utilize this state information in order to generate content for display to the first shopper 130*a* in the second MV display 150*b*. Any desired algorithm may be used to generate the content based on the state information. In one simple example, the system 100 will generate content based on the types of stores previously visited by the first shopper 130*a*. For example, if the first shopper 130*a* had visited other shoe stores in the mall environment 102 before arriving at Store 1, then the second MV display 150*b* may be used to display an advertisement for shoes being sold in Store 1 to the viewing zone 122*c* in which the first shopper 130*a* is positioned.

At the same time that the second MV display 150*b* is displaying the shoe advertisement to the first shopper 130*a*, the second MV display 150*b* may simultaneously display a different version of content to a third shopper 130*c* standing near the first shopper 130*a* in the viewing area of the second MV display 150*b*. For example, if no state information is known about the third shopper 130*c*, the second MV display 150*b* may display a generic or random advertisement to the viewing zone 122*d* in which the third shopper 130*c* is positioned. Alternatively, if the controller 152 has state information about the third shopper 130*c*, then the second MV display 150*b* can be used to display a different advertisement to the third shopper 130*c* based on that state information.

In some embodiments, the third shopper 130*c* may carry an identification device 132 comprising, e.g., an identification badge containing an active infrared (IR) LED that emits a unique visual identifier graphic (e.g., a unique identifier code) associated with the third shopper 130*c*. The sensing system 154 includes an IR camera 156, which can capture both the location and the identifier code of each identification device 132 in view, as will be described in greater detail below. The system controller 152 can use this identifier code to retrieve additional information about the third shopper 130*c*.

Multi-View Display System. Various embodiments of the present invention may combine one or more of the following elements: (1) a plurality of MV displays that may simultaneously present different versions of content that may vary depending on the location of the viewer relative to the MV display; (2) a sensing system for detecting viewers and/or other environmental characteristics; and (3) a controller. The controller can be used to monitor and manage the viewing zones of the MV displays, viewer states, viewer state transitions, and content assignments for the plurality of MV displays.

Figure 2:
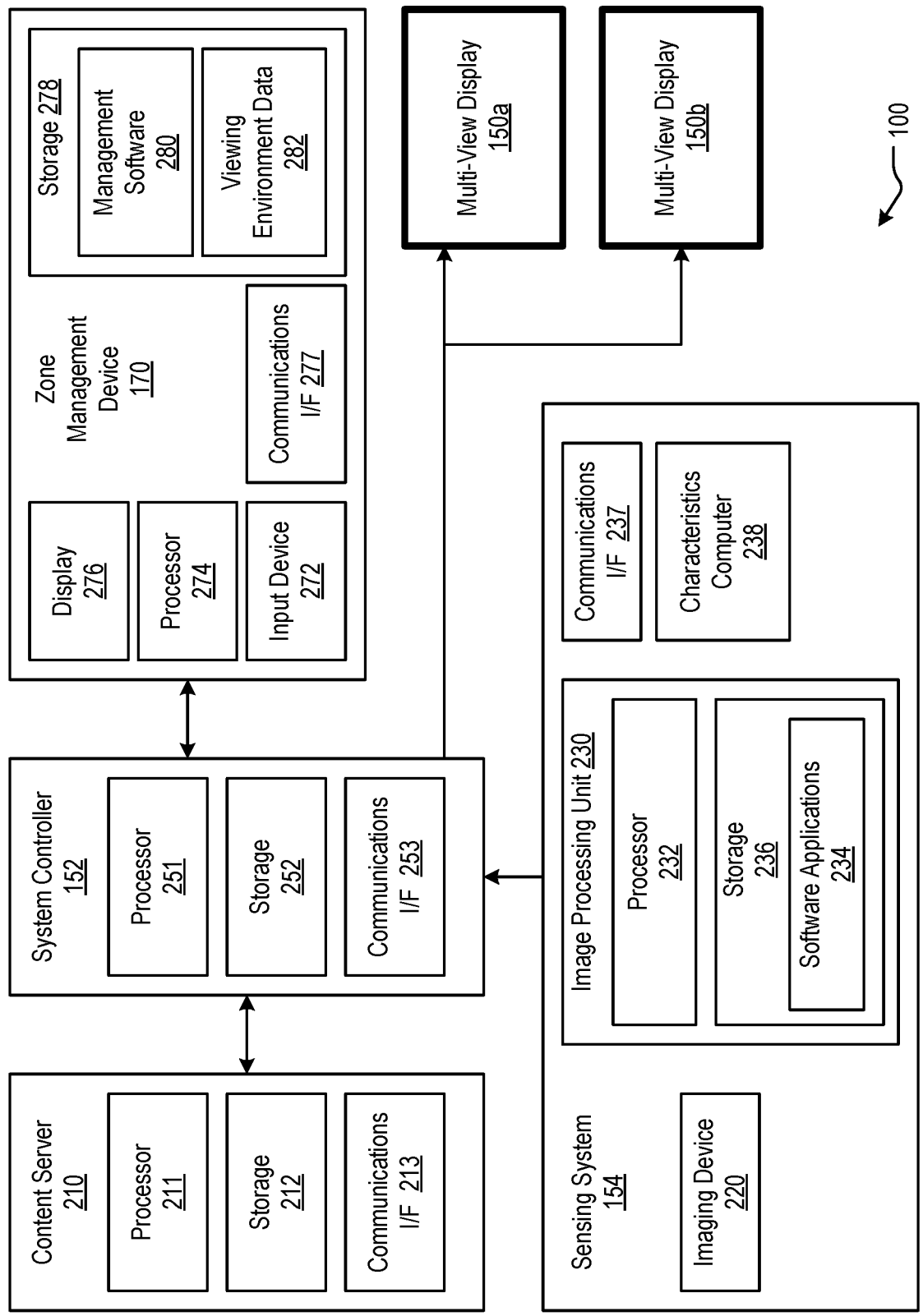
FIG. 2 is a block diagram of an MV system in accordance with embodiments of the present invention.

FIG. 2 is a block diagram of an MV system 100 in accordance with embodiments of the present invention. It is to be understood that FIG. 2 merely illustrates a simplified block diagram of one implementation of the MV system 100, and in other embodiments, the architecture of the MV system may vary. The MV system 100 illustrated in FIG. 2 comprises a plurality of MV displays (e.g., MV displays 150*a*-150*b*), a system controller 152, a sensing system 154, a zone management device 170, and a content server 210. In this embodiment, a viewer detection system is provided in sensing system 154, which may comprise a machine/computer vision system that captures images or videos of the scene in the detection space. The captured images/videos are then used to determine one or more characteristics of the viewing area and the viewers positioned in the viewing area.

The operation of each MV display 150 is managed via a system controller, such as system controller 152. In the illustrated embodiment, the system controller 152 directs the operation of multiple MV displays 150*a*-150*b*. For example, in some embodiments, system controller 152 will fetch content from content server 210 and then direct the operation of the MV displays 150*a*-150*b*, causing each MV display 150*a*-150*b* to display a specific versions of content to a specific viewing zones in the viewing area. As depicted in FIG. 2, system controller 152 includes a processor 251, a non-transitory computer-readable storage 252 operatively coupled to the processor 251, and a communications interface 253. Although the illustrative embodiment depicts a single controller 152, in some embodiments, the functionality of controller 152 is distributed among several devices, examples of which are provided below.

A zone management device 170 may be used to manage the viewing zones and/or assign visual content assignment for display on the MV display 150. As depicted in FIG. 2, zone management device 170 includes a processor 274, a non-transitory computer-readable storage 278 operatively coupled to the processor 274, a display 276, an input device 272, and a communications interface 277. Communications interface 277 may be similar to communications interface 253 and may enable communications with the system controller 152 and other devices. Although the illustrative embodiment depicts a single zone management device 170, in some embodiments, the functionality of the zone management device 170 is distributed among several computing devices. In one embodiment, the zone management device 170 can be used to set up the viewing zones for each MV display 150, either automatically or manually by a system administrator. The sensing system 154 and the system controller 152 can be used to detect the locations and/or characteristics of viewers, and assign versions of content to be displayed to each of the viewing zones established by the zone management device 170.

In some embodiments, conventional computer displays, screens, projectors, and other media delivery technologies may be utilized in conjunction with the MV displays to provide more immersion, content, and context while retaining customization, personalization, and other benefits provided by the differentiated content delivery.

Sensing System. In accordance with embodiments of the present invention, the MV display system 100 includes a sensing system 154 to provide inputs to the system controller 152. FIG. 2 includes a simplified block diagram of an exemplary sensing system 154. The sensing system 154 includes one or more sensing devices 155, such as, e.g., imaging devices 220 for image acquisition, and an image processing unit 230 for performing various digital image processing techniques for extracting the desired information. Embodiments of sensing system 154 with imaging device(s) 220 can provide information regarding the physical characteristics of the viewing environment, including the dimensions of one or more viewing areas in the viewing environment, and the location of viewer(s) with respect to one or more MV displays, in addition to providing viewer presence detection and viewer characterization. It will be appreciated that in such embodiments, in addition to or as an alternative to the imaging device(s) 220, other types of sensing devices 155 can be used for detecting the characteristics of the viewers and/or viewing environment (e.g., RF triangulation techniques, GPS, etc.).

The imaging device(s) 220 may include one or more digital cameras, including corresponding lenses and optional light sources that are designed, collectively, to provide the requisite differentiation for subsequent processing of the detected viewer and viewing environment characteristics. In some embodiments, the digital camera may include depth sensing functionality, such as structured light or time-of-flight cameras, which can generate a depth map of the images captured by the camera. This data can then be used to generate a 3D representation of the image captured by the camera. In other embodiments, the camera may be a stereoscopic camera, which utilizes two offset image sensors whose relative positions are known to generate a 3D representation of the images captured by the stereoscopic camera. In some embodiments, sensing system 154 can employ one or more conventional (2D visible light) imaging, although other techniques, such as imaging various infrared bands, line scan imaging, 3D imaging of surfaces, or other techniques may be used for image acquisition. In some embodiments, the imaging device may include a radar system for detecting the locations and/or velocity of objects in the viewing environment. Those of ordinary skill in the art will know how to make and/or specify and use a suitable imaging or sensing technology, such as various cameras, radar, or other imaging devices for the purposes of presence detection, location determination, feature extraction, and other computer vision functionality.

The imaging device 220 may be combined with image processing unit 230, which includes processor 232 running software applications 234 (such as, e.g., image processing software) stored in non-transitory computer-readable data storage 236. In some embodiments, imaging device 220 is physically separated from the image processing unit 230, the latter of which is implemented on a separate computer (not depicted) or on system controller 152 running appropriate image processing software.

Any of a number of image processing techniques may suitably be used, including, without limitation, stitching/registration, morphological filtering, thresholding, pixel counting, image segmentation, face detection, edge detection, object discovery, and manipulation, to a name a few.

In other embodiments, the sensing system 154 may utilize other technologies for detecting viewers and viewer locations instead of or in addition to the imaging device 220 examples described above. In some embodiments, one or more of the viewers in the viewing environment may carry an identification device encoded with viewer identity information. These identification devices can utilize any of a variety of technologies for enabling the identification of the viewer wearing the identification device. In some embodiments, the identification devices can enable identification of each viewer using, for example, a unique identifier code for each viewer. In other embodiments, the identification devices can be used to identify a category, classification, or other grouping of multiple viewers. In one example, each employee in the shopping mall environment may wear an identification badge that generically identifies that person as an employee of the mall, or, alternatively, identifies the store at which the employee is employed, but without any specific information about each individual employee.

In the embodiment described above with respect to FIG. 1B, the identification device 132 comprises a badge having an active IR LED that emits IR light encoded with identification information about the viewer 130c wearing the badge (e.g., a unique identifier code associated with the viewer 130c). The sensing system 154 includes an IR camera 156, such as, e.g., a reduced resolution IR camera or a line-scan camera to improve detection speed. The IR camera can capture both the location and the identifier code of each identification device 132 in view, and may be used instead of or in addition to other imaging or sensing devices. The encoding of the IR light emitted by the identification device 132 can be performed in any of a variety of techniques well known to those of ordinary skill in the art. In one example, the identification device 132 pulse modulates the IR light emitted by the IR LED with the encoded information. In other embodiments, the identification device need not utilize IR light, and can, instead, emit other wavelengths of electromagnetic radiation encoded with the identifier code. In yet other embodiments, the sensing system 154 can include a hybrid of sensors, with each sensor used to detect different types of information. For example, the sensing system 154 could include a first IR camera that can be used to detect the location of the third shopper 130c, but without the capability to quickly retrieve the identifier code of the identification device 132. A second, faster IR receiver can be used to retrieve identifier codes, but not to determine location. The multiple sensor data streams can be collectively analyzed by the sensing system 154 to determine both the location of the third shopper 130c as well as the identifier code of the identification device 132

In other embodiments, the identification device 132 may comprise a badge containing a radio-frequency identification (RFID) tag encoded with identity information for the viewer wearing the RFID tag. The sensing system 154 would then include an RFID reader instead of or in addition to the IR camera 156, which can wirelessly retrieve the encoded identity information from the identification device 132 and transmit this identity information to the controller 152.

In other embodiments, the identification device 132 may comprise a smartphone or other mobile computing device and the sensing system 154 may include a localization system configured to determine the location of a mobile computing device carried by a viewer. The mobile computing device may transmit short or long range wireless communication signals, such as, e.g., Bluetooth or WiFi. Wireless signal receivers may be positioned throughout the viewing environment and can be used to triangulate on the mobile computing device to determine the location of the device.

In some embodiments, such as the RFID tag and mobile computing device localization systems described above, the identification device continuously transmits the identity information. In other embodiments, the identification device may be configured to transmit identity information only when activated. This activation could be initiated manually by the user, such as, e.g., by pushing a button on a remote or app on a mobile device, or could be initiated by some other event. For example, the identification device may comprise a magic wand, toy, or other device held by a user, and the transmission of the identity information may be initiated when the device is utilized in a particular way. For example, the transmission of the identity information may be initiated when a motion sensing component (e.g., an accelerometer) contained in the magic wand detects that the wand is being shaken or when the magic wand is pointed at a particular target.

In some embodiments, the identification device carried by the viewers may also be provided with sensing functionality which can be used to detect environmental characteristics or conditions in the vicinity of the identification device, and then transmit information based on the detected characteristics or conditions to the sensing system 154. In the magic wand example, the magic wand device may include a wireless sensor for detecting when the magic wand device is in a particular location or in the vicinity of a particular target, which would transmit a short-range beacon signal that can be detected by the magic wand. The magic wand can then transmit identity information about the viewer as well as information about the location or target received via the short-range beacon signal.

It is to be understood that the identification badges described herein are merely an example, and any suitable physical implementation can be used for the identification device 132, such as, e.g., a bracelet, loyalty card, medallion, hat or other head-mounted wearable, article of clothing, flag, lanyard, pin, clip, sticker, decal, or emblem. The identification badge could be provided in accordance with a particular theme, such as the magic wand in a magical quest game. In other embodiments, the identification badge may be incorporated into a device providing other functionality, such as a mobile phone, shopping bag, carrier, bag handle, basket, shopping cart, etc.

Content Generation System. Differentiated versions of content may be generated for each viewing zone by a content generation system, which can be, e.g., embodied as content server 210 in FIG. 2. Content server 210 may include a processor 211, a non-transitory computer-readable storage 212 operatively coupled to the processor 211, and a communications interface 213.

Although the illustrative embodiment depicts a single content server 210, in some embodiments, the system 100 includes multiple content servers 210. Furthermore, in some embodiments, the functionality of content server 210 is distributed among other elements of the system 100 and may be implemented using the same server, computer, or other hardware as system controller 152 and/or sensing system 154. This might be desirable, for example, if the content generation functionality can be more efficiently performed locally rather than over a network. For example, an MV system may be used as a MV display speed sign that detects the speed of each car on a road or highway and displays each car's detected speed to the driver that car. In this case, the sensing system is adapted to determine the location and speed of travel of each car. The version of content to be targeted to the viewing zone corresponding to the location of the car is a graphical display of the determined speed of travel. Accordingly, the output of the sensing system can be directly used to generate the content for display, without any need to retrieve additional content from a separate content server over a network.

Content generation includes selecting from (1) pre-generated content or (2) generating the content in real time. The pre-generated content may comprise, for example, text, images, videos, other graphical content (e.g., an icon, arrow, pointer, single light, multiple lights, colored lights, light or images projected at a predefined rate or pattern), and/or other content. The content generated in real time may include, for example, information about the audience or other event occurring in real time.

The components of the various computing devices illustrated in FIG. 2 can be implemented using any suitable combination of hardware and software. The processors 211, 232, 251, and 274 may be general-purpose processors that are capable of, among other tasks, executing an operating system and executing application software used in conjunction with embodiments of the invention. The processors 211, 232, 251, and 274 may be capable of populating, updating, using, and managing data in the respective data storages 212, 236, 252, and 278. In some alternative embodiments of the present invention, one or more of the processors 211, 232, 251, and 274 may be special-purpose processors. It will be clear to those skilled in the art how to make and use the processors 211, 232, 251, and 274.

The storages 212, 236, 252, and 278 may comprise non-volatile, non-transitory, machine-readable memory (e.g., ROM, EPROM, EEPROM, hard drive(s), flash drive(s) or other solid state memory technology, CD-ROM, DVD, etc.) that stores data (such as pre-generated content) and application software, which, when executed, enable the corresponding the processors 211, 232, 251, and 274 to execute the various tasks and functionality described herein. Instructions stored on the memory may embody any one or more of the methodologies or functions described herein. The instructions may also reside, completely or at least partially, within the main memory, within the processors 211, 232, 251, and 274 (e.g., within the processor's cache memory), or both, before or during execution thereof. The instructions may also reside in a static memory of the content server 210, system controller 152, sensing system 154, and/or zone management device 170. Accordingly, the main memory and the various processors may also be considered machine-readable media (e.g., tangible and non-transitory machine-readable media). The instructions may be transmitted or received over a network via a communication interface, as described below.

The communications interfaces 213, 237, 253, and 277 may enable communications between the various components of the MV system 100, as well as other computing devices on a local area network with the MV system 100, or on a wide area network such as the Internet, e.g., to access news sites, social media sites, etc., via any appropriate medium, including wireline and/or wireless, and via any appropriate protocol (e.g., Bluetooth, Wi-Fi, cellular, optical, ultrasound, etc.). The term "communications interface" is meant to include any electronic communications technologies and, as appropriate, various supporting equipment, such as communications ports, antennas, etc. Different versions of content relating to the information received from other computing devices outside of MV system 100, such as news websites or social media websites, can then be selectively displayed by the MV displays 150.

Content Presentation System. After generating the various versions of visual content, that content is displayed to the various viewing zones in the viewing areas in the viewing environment using one or more MV displays 150 and the system controller 152 based on state information acquired about the viewers in those viewing zones. The MV displays and associated control, content, and sensing systems can simultaneously present multiple versions of visual content that may vary by viewing location and may be used as a system with technologies and procedures that facilitate, e.g., calibration, content design, viewing location layout, tracking, sensing, and analysis.

The MV displays can be implemented using a variety of technologies. One embodiment of an MV display may contain one or more projection elements, or directional pixels, each of which may be controlled so as to selectively project light, different colors, and different brightness levels, in multiple directions within the MV display's viewing area. As a result, the appearance of each projection element or pixel may vary depending on the viewer's location relative to the MV display. For example, a first person observing the MV display might see an illuminated pixel, while the same pixel might not appear illuminated to a second person simultaneously looking at the pixel from a different location (e.g., the second person standing in a different viewing zone of the MV display than the first person). Alternatively, the pixel might appear blue to one person and simultaneously appear red to another person in a different location. An MV display may contain an array of these directional pixels, allowing the simultaneous projection of multiple versions of content that can be differentiated depending on viewing location. In some embodiments, each projection element includes a light source, an imager, and a lens. The light source illuminates the imager and the imager filters or directs the light through the lens. The lens is capable of directing light that is received from different locations of the imager in different directions. Examples of suitable imagers include, without limitation, digital micro-mirror devices, liquid crystals, light emitting diodes, and/or liquid crystal on silicon (LCOS). The light source illuminates the imager and the imager filters or directs the light through the lens.

Each projection element can be considered to be a single multi-view pixel of the display, wherein a full graphic MV display is formed from an array of such projection elements. In some embodiments, each projection element is controlled by its own processor. In other embodiments, a processor controls multiple or all of the projection elements in the MV display. In some embodiments, all of such processors in the MV display are connected via a network (e.g., Ethernet, Infiniband, 1 2C, SPI, Wi-Fi, etc.), or, more generally, a communication channel (e.g., HDMI, etc.).

A similar functionality may be achieved by placing a lens or array of lenses over a display panel, giving each lens the capability of serving as a directional pixel or pixels presenting the different colors on the underlying display panel so that the light from each lens may have a different appearance depending on the viewer's location relative to the display. Other methods may also be used for transforming a conventional single color pixel into a directional pixel that has a different appearance depending on the angle/location from which it is viewed. These systems and others can be used in conjunction with a number of methods to display differentiated versions of visual content that is specific to location, individual, and other variables.

In some implementations of multi-view pixels, a multi-view pixel can be implemented using a projector similar to a conventional image projector. A conventional image projector projects a plurality of narrow light beams toward a projection screen. In contrast, a multi-view pixel is capable of controllably directing light (each controllable beam referred to herein as a "beamlet") in a plurality of directions. The color and brightness in different directions, corresponding to different beamlets, can be different. A multi-view pixel is similar to a conventional image projector in that it emits a number of beamlets, but the beamlets are not intended for forming an image on a screen. Rather, they are intended to fall upon the eyes of a viewer. Each multi-view pixel, from a viewer's perspective, appears to be a light source of the color and brightness of the beamlet that is projected by that pixel onto the viewer, even if the projection would be too dim for any image to be visible if projected onto a nearby surface. As a consequence, the appearance of each multi-view pixel from the perspective of a viewer is dependent upon the angle at which the viewer views it. In other embodiments, the multi-view pixels can be implemented using a plurality of lenses positioned over a display panel, with each lens operating as a single multi-view pixel. In other embodiments, any of a variety of technologies capable of achieving the desired effect of sending different visual information in different directions from the same pixel, or array of pixels, or display, may be used for the MV display.

In example MV displays, each projection element pixel has a projection space comprising a plurality of projection angles. A projection element may project a beamlet of a particular color and brightness at each discrete projection angle, and may project beamlets of different color and brightness at different projection angles. For example, in an embodiment utilizing traditional projectors, the viewing angles are quantized and defined by the pixels of the projector, and may be measured by the pixel coordinates.

It is noted that an MV display may comprise multi-view pixels not arranged in a regular rectangular array, such as the arrangement of pixels in a traditional display. MV displays can also be configured into many different shapes, forms, sizes, and configurations to better aid visibility to targeted viewers, concealment from others who are not targeted viewers, aesthetic appeal, functional impact, adaptation to the surrounding environment, and other considerations. Multi-view pixels can be arranged in non-traditional configurations, including, but not limited to, hexagonal arrays, linear arrays, non-uniform patterns, geometric shapes, and/or figure outlines. Multi-view pixels can also be arranged in non-planar configurations. For example, multi-view pixels can be configured to follow the contour of a surface, or an arbitrary 3D configuration. For example, directional pixels might be incorporated into organic shapes, such as, e.g., a rock face or tree trunk; into decorative elements, such as, e.g., murals or sculptures; around geometric shapes, such as, e.g., a sphere, oval, or ribbon; into architectural and landscape features, such as, e.g., walls, ceilings, floors, pools, fountains, furnishings, columns, steps, soffits, bollards, parapets, rooflines, and building outlines; or into traditional media forms such as, e.g., billboards and scoreboards—all by way of example. In this manner, MV displays can be incorporated into any environment. MV displays can include multi-view lighting systems, where the multi-view pixels show different lighting patterns at different angles.

In one example scenario, an MV display is used to selectively show captioning to seats in a theater. In this example, each seat has a clear line-of-sight to the MV display, unobstructed by other seats or objects. For each multi-view pixel, a seat is associated with a collection of beamlets that are projected onto that seat, defining a viewing zone. Each beamlet maps to a unique location in the viewing area comprising the seats. Therefore, to show a particular content to a designated a seat, the MV display lights the beamlets associated with that seat with the appropriate colors and brightness.

In other embodiments, beamlets may not map to unique viewing locations in the viewing area. For example, a first viewing zone may be located directly in front of a second viewing zone relative to the MV display. As a result, a beamlet projected in that direction passes through both the first and the second viewing zones. In such a scenario, the sensing system and the MV display controller will estimate the landing spots of each beamlet to determine the viewing zone in which that beamlet will land, and thus determine the version of content to be shown by that beamlet. For example, the sensing system and MV display controller may determine whether a person is located in the first viewing zone, in which case the content to be shown by that beamlet will correspond to the version of content assigned to the first viewing zone. Alternatively, the sensing system and MV display controller may determine that no one is located in the first viewing zone, but a person is located in the second viewing zone, in which case the content to be shown by that beamlet will correspond to the version of content assigned to the second viewing zone.

Generally, the intended viewer is human, but optical devices such as cameras can also be used as a viewer of an MV display, and it is also possible to utilize MV displays wherein intended viewers might be non-human viewers such as animals, cameras, mirrors, sensors, or other image-capturing, image-sensing, or light sensing entities. In some embodiments, a viewer may comprise an autonomous vehicle, robot, or other device that may be triggered by or respond to content displayed on an MV display. In other embodiments, a viewer may comprise a retransmission device that can capture the content being displayed on an MV display and then relay that content elsewhere, such as for a check, signal, or alarm.

In a multi-view pixel, each beamlet's light can be controlled independently of the light of other beamlets. For example, and without limitation, the light intensity and/or color of an individual beamlet might be controllable independently of the intensity and/or color of the light of other beamlets. Other parameters of beamlet light might also be controlled, such other parameters comprising, for example, spectral composition, polarization, beamlet shape, beamlet profile, overlap with other beamlets, focus, spatial coherence, temporal coherence, etc., to name just a few.

A viewer that looks at a multi-view pixel sees the light of one or more beamlets; in particular, the viewer sees the light of those beamlets that are emitted by the multi-view pixel and fall upon a viewer's pupil. The viewer perceives the multi-view pixel as glowing with the combined light of those beamlets. As with conventional pixels, a multi-view pixel can have a variety of shapes, as perceived by the viewer looking at the multi-view pixel.

Figure 3A:
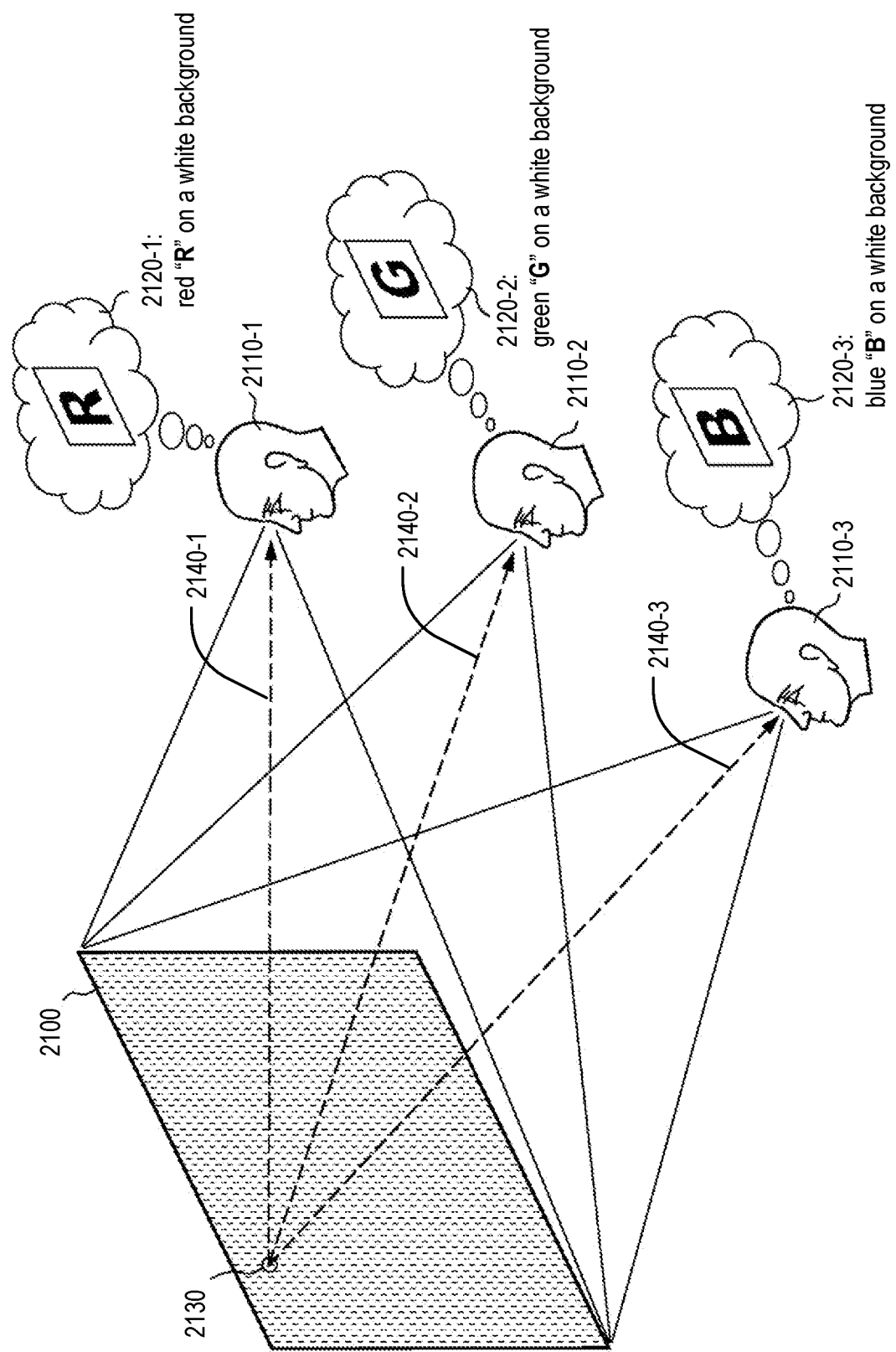
FIG. 3A illustrates the functionality of a multi-view display in accordance with embodiments of the present invention.

FIG. 3A illustrates the functionality of an MV display 2100 being viewed simultaneously by three viewers 2110-1, 2110-2, and 2110-3. The three viewers 2110-1, 2110-2, and 2110-3 are positioned at three distinct positions from which the MV display 2100 is visible. Each of the three viewers 2110-1, 2110-2, and 2110-3 sees a different image on the display surface of the MV display 2100. The three different images seen by the three viewers are depicted in FIG. 3A as images 2120-1, 2120-2, and 2120-3. In particular, viewer 2110-1 sees a red letter "R" on a white background, viewer 2110-2 sees a green letter "G" on a white background, and viewer 2110-3 sees a blue letter "B" on a white background.

For each of the three viewers 2110-1, 2110-2, and 2110-3, the experience of viewing the MV display 2100 is similar to viewing a conventional display, such as a standard television set, but each viewer sees a different image on the display surface of the MV display 2100. Each viewer is, possibly, not even aware that other viewers are seeing different images. The term "viewing area" is used herein to refer to the range of possible positions for viewers to experience the MV display functionality.

The functionality of MV display 2100 is based on the functionality of the individual multi-view pixels of the MV display. One such multi-view pixel is depicted in FIG. 3A as multi-view pixel 2130. The functionality of the multi-view pixel is best understood by comparison with the functionality of a conventional pixel in a conventional display. A conventional pixel is simply a light source that emits a particular type of light in all directions of emission. For example, in a conventional television set, a pixel is typically implemented with a material that glows when electrically excited. The glow is typically in one of the three primary colors. The glowing material emits colored light uniformly in all directions.

In a scenario like the one depicted in FIG. 3A, if the MV display 2100 were a conventional display, the light emitted by each conventional pixel would reach the eyes of the three viewers with the same color and approximately the same brightness. All three viewers would see the same image on the display surface as a collection of glowing conventional pixels.

In contrast to a conventional pixel, multi-view pixel 2130 is able to emit different light in different directions. In each direction, light of a particular type is emitted as a narrow beam, referred to as a beamlet. FIG. 3A depicts three beamlets 2140-1, 2140-2, and 2140-3, wherein beamlet 2140-1 is aimed at the eyes of viewer 2110-1, beamlet 2140-2 is aimed at the eyes of viewer 2110-2, and beamlet 2140-3 is aimed at the eyes of viewer 2110-3.

In the illustrative example of FIG. 3A, to avoid clutter, the beamlets are depicted as simple dashed lines with an arrowhead indicating the direction of propagation of beamlet light; however, beamlets can have any size and shape. For example, and without limitation, beamlets might have a shape similar to the beam from a searchlight, although, of course, much smaller; but, in general, the optimal size and shape of beamlets depends on the application, environment, and construction of the MV display. MV displays for different uses can have different beamlet sizes and shapes. In some embodiments, different beamlet sizes and shapes might even be found together in the same MV display, or even in the same multi-view pixel.

In the scenario of FIG. 3A, each beamlet is wide enough such that both eyes of each viewer can be expected to be within the same beamlet. Therefore, both eyes are expected to see the same light (e.g., the same color and brightness). However, MV displays can exist wherein beamlets are small enough that distinct beamlets reach the two distinct eyes of a viewer, such that each of a viewer's eyes sees a different color and/or brightness. This stereoscopic approach may be used to provide the viewer with a perception of 3D depth.

In the illustrative example of FIG. 3A, the three beamlets 2140-1, 2140-2, and 2140-3 each carry light corresponding to the brightness of the image that each viewer is intended to see. For example, as noted above, viewer 2110-2 sees a green letter "G" on a white background, while viewer 2110-3 sees a blue letter "B" on a white background. Correspondingly, there are areas of the display surface where viewer 2110-2 is intended to see the color white while viewer 2110-3 is intended to see the color blue. If multi-view pixel 2130 lies in one such area, beamlet 2140-2 will carry white light, while beamlet 2140-3 will carry blue light. As in conventional displays, viewers perceive images as a collection of pixels of various colors and brightness. With MV display 2100, the ability of multi-view pixels to emit different beamlets in different directions makes it possible for different viewers to perceive the same multi-view pixel as having different colors and different brightnesses, such that each viewer sees the collection of multi-view pixels as a different image.

Figure 3B:
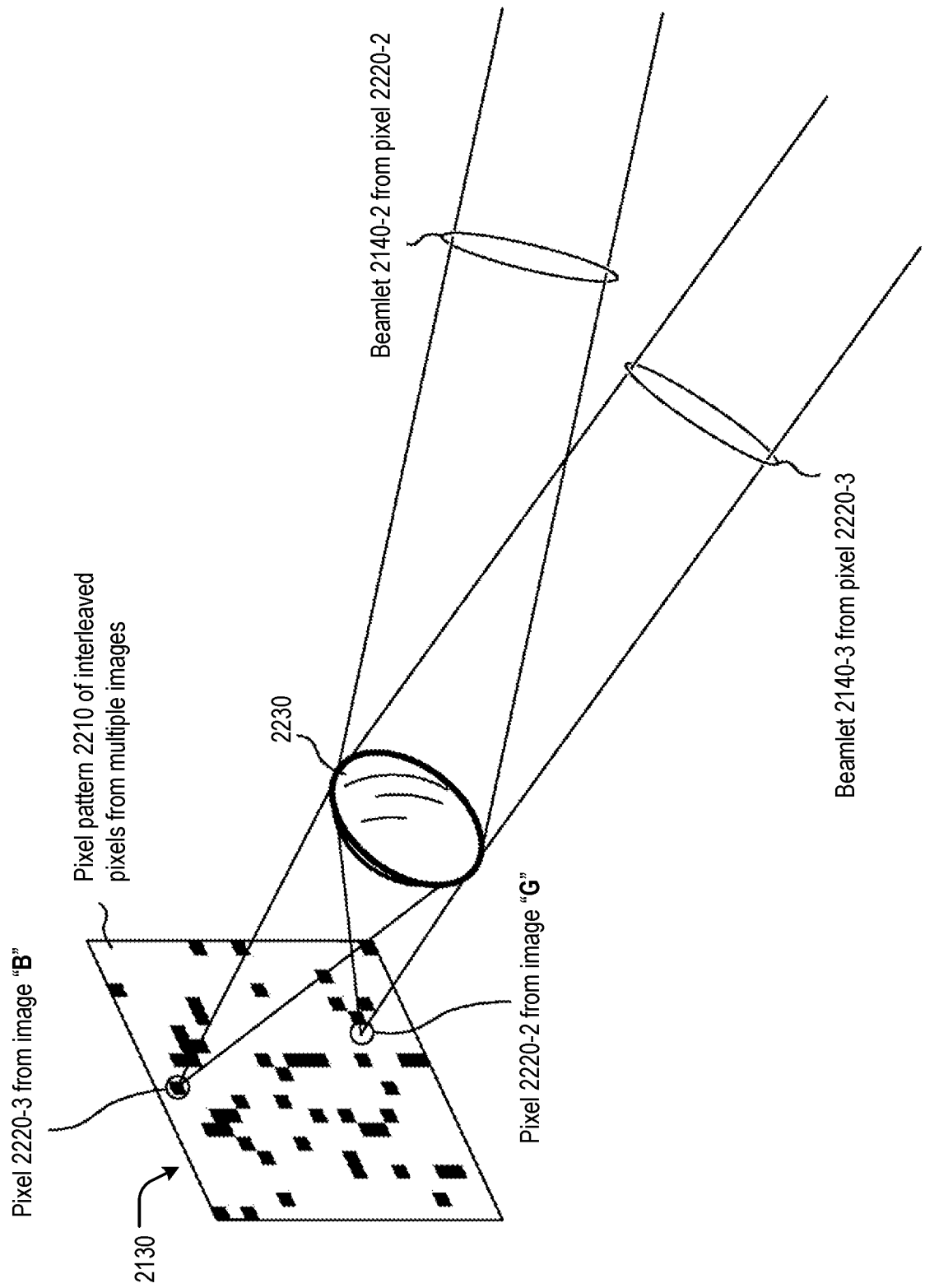
FIG. 3B depicts an illustrative implementation of a multi-view pixel in accordance with embodiments of the present invention.

FIG. 3B depicts a possible illustrative implementation of multi-view pixel 2130. The multi-view pixel comprises a pixel pattern 2210. In FIG. 3B, pixel pattern 2210 is a rectangle with 400 conventional pixels arranged in a 20×20 array. This 20×20 array enables the multi-view pixel to emit as many as 400 different beamlets. Each beamlet originates as a pixel in pixel pattern 2210.

Lens 2230 implements the conversion of a pixel in pixel pattern 2210 into a beamlet. For example, pixel 2220-2 is the pixel that is converted into beamlet 2140-2. As already noted, beamlet 2140-2 is intended to carry white light. Accordingly, pixel 2220-2 may be a conventional pixel that comprises a material able to glow, emitting white light when electrically excited with an appropriate electrical excitation. In the illustrative implementation of FIG. 3B, pixel 2220-2 is electrically excited and emits white light in all directions. Lens 2230 collects a sizable fraction of the emitted white light and collimates it into beamlet 2140-2. Similarly, pixel 2220-3 is the pixel that is converted into beamlet 2140-3, and is intended to carry blue light. Correspondingly, pixel 2220-3 may be a conventional pixel that comprises a material able to glow, emitting blue light. In the illustrative implementation of FIG. 3B, pixel 2220-3 is emitting blue light in all directions. Lens 2230 then collects a sizable fraction of the emitted blue light and collimates it into beamlet 2140-3.

The depiction of the single multi-view pixel 2130 in FIG. 3B is intended to be representative of each of the multi-view pixels in MV display 2100 as well as of similar multi-view pixels in other MV displays. Accordingly, this disclosure will refer to "the pixel pattern 2210" or "the lens 2230" of a multi-view pixel other than multi-view pixel 2130 in order to refer to the equivalent structure of that other multi-view pixel.

The depiction of multi-view pixel 2130 presented in FIG. 3B is similar to the principle of operation of a typical image projector. Indeed, the functionality of the multi-view pixel 2130 may be similar to the functionality of an image projector, with some important differences:

Difference 1: An image projector is typically used for projecting an image onto a screen for viewing. It is desirable for the projected image to be as sharp as possible. Accordingly, a projector's lens is adjusted for best focus. In a multi-view pixel, such an adjustment would result in beamlets that are very small at the focal distance. This is not usually desirable because the optimal size of beamlets depends on the desired multi-view experience provided to viewers. For example, and without limitation, if all viewers in a particular area of a room are intended to see the same image, this can be accomplished via beamlets that are each as large as that area of the room. Also, an ideally-focused projector creates non-overlapping dots on the screen. In contrast, it might be desirable for adjacent beamlets to overlap somewhat, so as to avoid gaps in the viewing area.

Difference 2: An image projector typically has non-overlapping pixels of different colors. Usually, each pixel emits only one of the three primary colors. Correspondingly, the projected image consists of non-overlapping dots wherein each dot is of one of those colors. The visual perception of a full color palette is achieved because, from a distance, the individual dots are not resolved by the human eye, and the three primary colors blend together into a perceived color that depends on the relative strength of the primary colors. In contrast, a single beamlet of a multi-view pixel might carry the full palette of possible colors. For example, beamlet 2140-2 is intended to carry white light because the background of image 2120-2 is white. To allow the background of image 2120-2 to be any color, beamlet 2140-2 should be able to carry light of any color. Therefore, in the illustrative implementation of FIG. 3B, pixel 2220-2 should be able to emit light of any color. This could be accomplished, for example, by positioning a diffuser in front of the image projector so as to diffuse the light emitted by the projector, thereby blending together the light from each of the RGB sub-pixels into a single beamlet.

In alternative implementations, beamlets might be sized large enough to have substantial overlap, such that at each position in the viewing area, three or more beamlets are simultaneously visible from the same multi-view pixel or from nearby multi-view pixels. In such implementations, it might be acceptable to have monochromatic (single-color) beamlets, because the relative strength of overlapping beamlets can be adjusted to yield a desired color perception.

Difference 3: An image projector must emit light bright enough for a visible image to form on the screen. Indeed, a person that walks in front of a projector and looks toward the projector usually finds the brightness to be unpleasantly bright and objectionable. In contrast, a viewer of an MV display may be looking directly at the light emitted by the multi-view pixels. The light should be bright enough to be visible, but not so bright as to be objectionable. As a result, if a multi-view pixel were used as a conventional projector to project an image onto a screen, the image on the screen can be expected to be inadequately faint. The resulting projected image is likely to be virtually difficult to detect in normally-lighted environments.

Figure 3C:
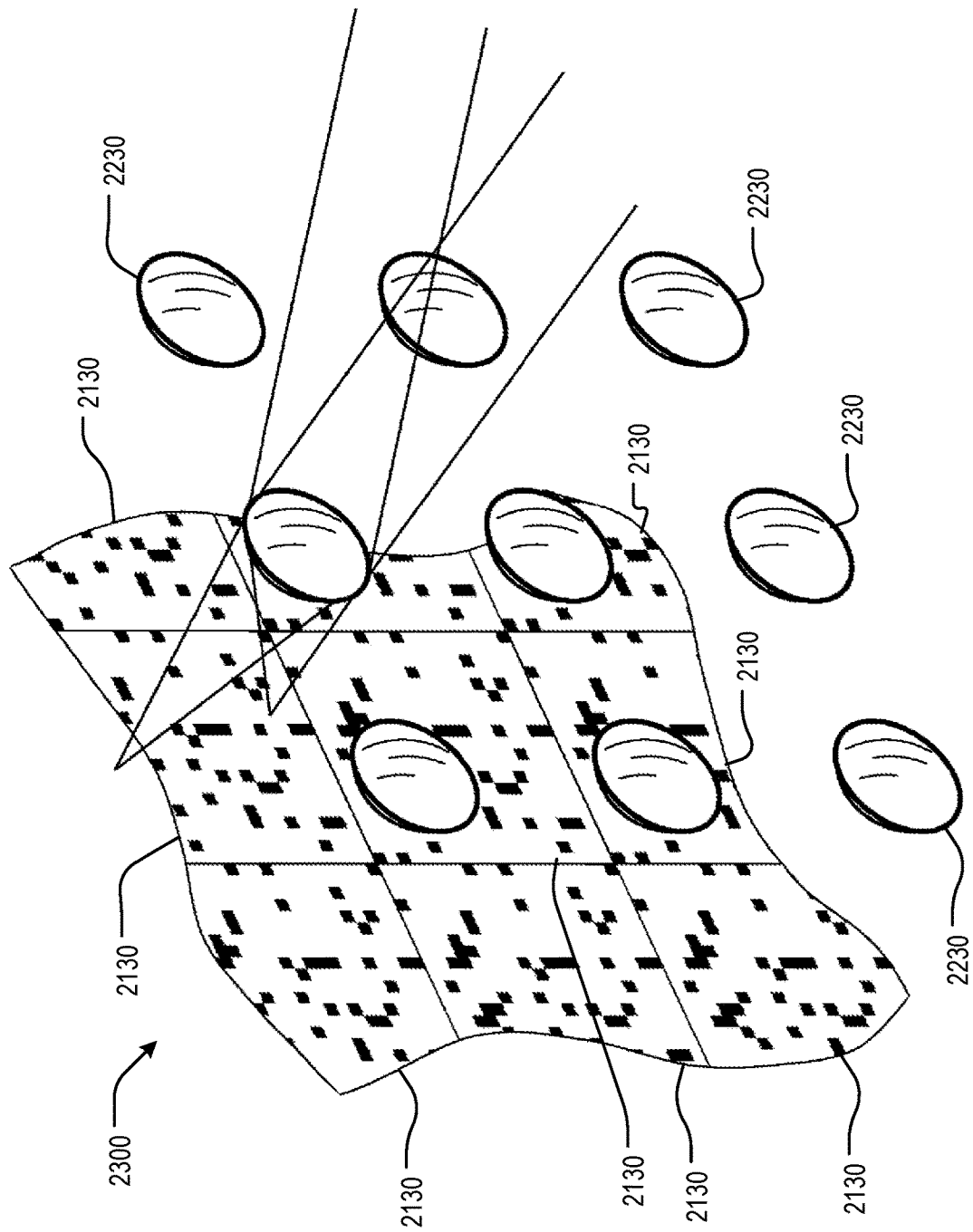
FIG. 3C illustrates an example array of multi-view pixels in accordance with embodiments of the present invention.

FIG. 3C illustrates how multiple multi-view pixels might be assembled together as an array to form an MV display. In a conventional display, a regular (usually rectangular) array of adjacent pixels is typically used to form images. In an MV display in accordance with the illustrative example of FIG. 3C, the multi-view pixels 2130 are also arranged in a rectangular array 2300, a portion of which is shown in FIG. 3C. The pixel patterns 2210 of the multi-view pixels 2130 are juxtaposed in a rectangular array, and corresponding lenses 2230 are positioned in front of the associated pixel pattern 2210, so that the lenses 2230, too, are arranged in a rectangular array.

A viewer of the MV display 2100 such as, for example, viewer 2120-1, looking at the array of lenses, may see one beamlet 2140 from each of the lenses 2230. In other words, each lens 2230 may appear as a disc that emits the light of the beamlet that reaches the viewer 2120-1 from that multi-view pixel. From a distance, the collection of discs is perceived by that viewer 2120-1 as an image, much the same way as the collection of conventional pixels of a conventional display is perceived as an image, when viewed from a distance. Alternatively, the MV display 2100 might be for displaying numbers or characters as patterns of dots wherein each disc is a dot.

In FIG. 3C the lenses 2230 are shown as floating in space; the support structure for the lenses 2230 is not shown. In practice, the lenses 2230 might be supported, for example, and without limitation, by a dark sheet that, in addition to mechanical support, would also provide an opaque background and would block stray light from the pixel patterns 2210. From a distance, the light from the pixel patterns 2210 would then only reach the viewer's eyes via the beamlets that pass through the lenses. The viewer would see the lenses as illuminated discs on the dark background of the dark sheet. A mechanical support for the lenses is not shown in FIG. 3C in order to better illustrate the arrangement of pixel patterns 2210.

In electronic displays, pixels are usually arranged in a rectangular array. To prepare an image for displaying, the image is typically "rasterized", meaning that the image is subdivided into a plurality of small rectangles that match the geometry of the pixel array. The average color and brightness of each small rectangle determines the color and brightness of a corresponding pixel. In modern electronic displays the accuracy with which pixels are positioned in the pixel array is excellent, such that the correspondence between small rectangles and pixels can be derived computationally, based on the nominal geometry of the array, without the need to know in advance any additional parameters specific to the display unit that will be used for showing the image. With most conventional displays, it is also not necessary to know in advance how and where the display will be installed.

With a multi-view pixel such as multi-view pixel 2130, it is reasonable to expect that the pixel pattern 2210 can be made as, for example, and without limitation, a rectangular array of conventional pixels with the same degree of accuracy that is feasible for the abovementioned conventional displays. This could be expected to result in a pattern of beamlets wherein the relative geometry of the beamlets can be accurately derived from the geometry of pixel pattern 2210. This, however, might not be easy to accomplish. Beamlet geometry is altered by any imperfections in lens 2230, and the pattern of beamlets, as they reach locations in the viewing area, depends significantly on the geometry of the viewing area itself and on the position and orientation of the multi-view pixels relative to the viewing area.

Although FIG. 3C depicts distinct multi-view pixels 2130 as being identical to one another and identically oriented, in other embodiments, it might be desirable for an MV display to have multi-view pixels of different types. Also, it may be advantageous for multi-view pixels to be oriented differently in different areas of the display surface. For example, multi-view pixels near the center of the display surface could be oriented such that their beamlets propagate symmetrically outward, relative to the plane of the display surface, while multi-view pixels near the edge of the display surface could be oriented such that beamlets propagate more toward the center of the display. This might be done in order to achieve optimal coverage of the viewing area. Such differential orientation could be accomplished by changing the orientation of individual multi-view pixels placed on a flat surface, or it might be accomplished by making the display surface curved (e.g., by arranging the multi-view pixels such that all of the lenses in the array are not coplanar). In other situations, such as in the case of MV displays for irregular surfaces and other similar applications, the orientations of the multi-view pixels might be in very non-standard configurations that can be difficult to characterize a-priori. In all such cases, it might be difficult to know a priori the exact orientation of each multi-view pixel. Embodiments of the present invention can advantageously provide a calibration process for learning the orientation of all beamlets of all the multi-view pixels.

Calibration. To provide the various forms of desired content to each of their corresponding viewing zones, a calibration procedure may be used to associate beamlets of an MV display with viewing locations, and to determine the colors and brightness needed for each pixel. The calibration may be achieved with the aid of a sensing system (e.g., a camera or cameras mounted on, or located near, the MV display), or through some other method. The calibration procedure may compute a relationship between the beamlets and the viewing zones. This relationship can include, but is not limited to, tables, mathematical relationships, and/or functions.

The viewing area of an MV display can be measured by a coordinate system. In one example, the coordinate system can be based on the physical dimensions of the viewing area. In another example, the viewing area can be within sight of a 2D camera of sensing system 154, and the coordinate system can be set by the 2D pixel coordinates in the camera. In this case, the 3D space of the viewing area may be calibrated using a 2D coordinate system based on a 2D representation of the viewing area. In yet another example, the viewing area can be within sight of a depth sensor, such as a stereoscopic camera, and the coordinate system can be the 3D coordinate system of the depth sensor.

Calibrating to a Sensing System. As described above, in some embodiments, an MV display can be calibrated to a sensing system that is sensing one or more characteristics of the viewing area. The coordinate system of the viewing area could be set as the coordinate system of the sensing system. Example sensing systems include, but are not limited to, cameras and/or depth sensors.

As an example, the beamlets of a multi-view pixel can be arranged in a rectangular grid and indexed by the X and Y coordinates of the beamlet. This would be the case if a multi-view pixel were implemented using a traditional projector. The viewing area is within sight of a 2D camera. The calibration procedure can compute a mathematical relationship between the beamlet coordinates in the multi-view pixel and the camera pixel coordinates of the associated viewing zone as captured by the 2D camera. With this relationship, the viewing zone of any beamlet in the multi-view pixel can be computed.

When using a 2D camera to establish a coordinate system of the viewing area of an MV display, an issue arises where the viewing area is a 3D space. The pixel coordinates of a 2D camera, in this case, would map not to a unique viewing zone in the viewing area but a ray of viewing zones with the same angle relative to the camera. To address this, the mathematical relationship between the beamlets of the multi-view pixel and the 2D coordinate system of the 2D camera may be defined for a set of viewing zones with unique angles relative to the 2D camera. An example of such a set of viewing zones can include, but is not limited to, a set of planes.

In accordance with embodiments of the present invention, an example calibration process may be performed using an MV display, a sensing system (e.g., a first 2D camera), and a repositionable calibration device. The calibration device may comprise a second 2D camera, a processor, and a light source (e.g., an LED) positioned approximately at the location of the second camera. The following example procedure can be performed. The calibration device is positioned in a first location within the viewing area corresponding to a first viewing zone. In step 1, the LED of the calibration device is flashed. In step 2, images of the viewing area are captured using the first 2D camera of the sensing system. In step 3, the location of the calibration device LED in the 2D camera coordinate system is determined using image processing techniques. In step 4, patterns are flashed on the MV display to uniquely encode every beamlet of every multi-view pixel. In step 5, images of the MV display are captured using the second 2D camera of the calibration device. In step 6, the beamlet from each multi-view pixel that is captured by the 2D camera of the calibration device while in the first location is determined using image processing and decoding techniques. In step 7, the beamlet and viewing zone association is recorded. In step 8, the calibration device is repositioned into the other viewing zones in the viewing area, and steps 1-7 are performed for each of those viewing zones. In step 9, an approximate mathematical relationship between the beamlets and viewing zones given the recorded beamlet and viewing zone associations is computed.

A similar procedure can be performed using a depth sensor instead of the first 2D camera of the sensing system. In this case, the relationship between beamlets and viewing zones can be computed for all viewing zones within the 3D viewing area, and may not be limited to viewing zones with unique viewing angles.

The complexity of the computed mathematical relationship can be dependent on the characteristics of the multi-view pixel and camera or depth sensor. For example, if a traditional, undistorted projector is used as a multi-view pixel and the camera is also undistorted, a simple linear model can be used. However, lens distortion and other effects can cause the mapping between the beamlet and viewing zones in the camera coordinate system to fit poorly with a linear model. In such cases, more complex or higher order mathematical models may need to be used to produce a more accurate relationship.

Figure 3D:
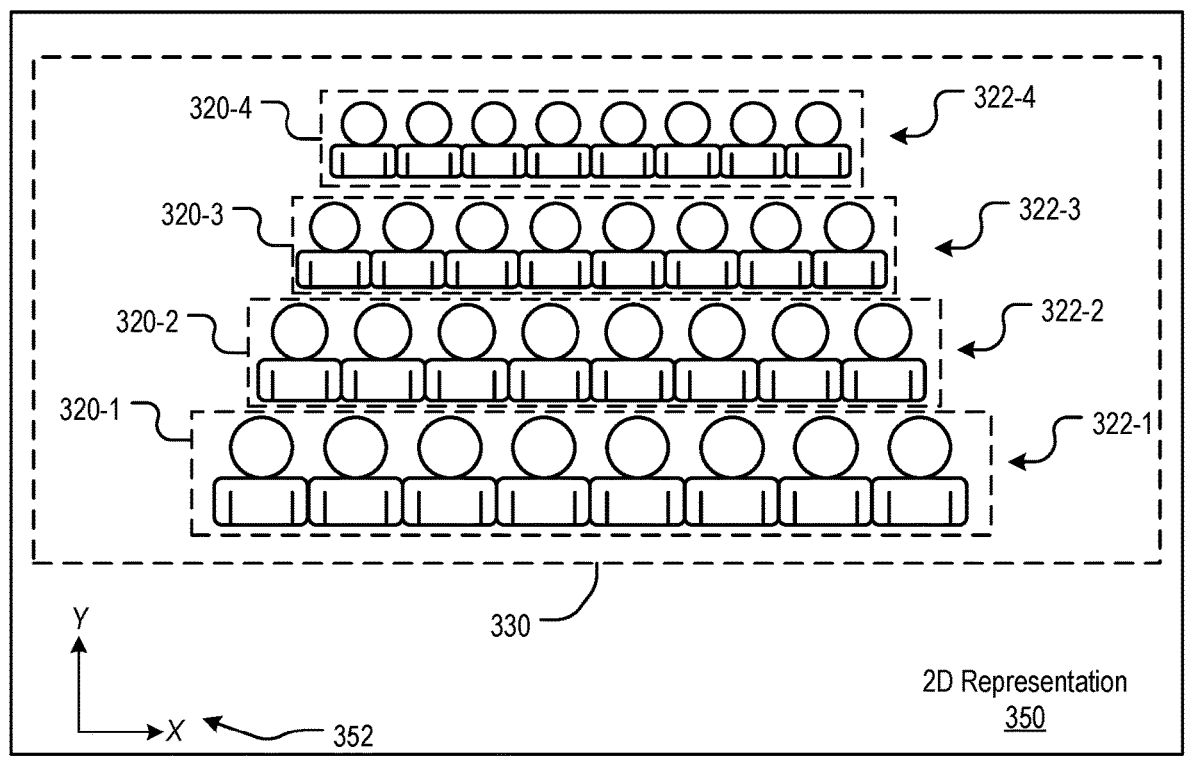
FIG. 3D illustrates a two-dimensional representation of a three-dimensional viewing environment in accordance with embodiments of the present invention.

In a simpler implementation illustrated in FIG. 3D, a 2D camera captures a 2D image of the 3D viewing area 330, and the coordinate system can be set by the 2D pixel coordinates in the camera. For example, when the viewing area is a theater having stadium seating such that a 2D image captured by the 2D camera can be used to produce a 2D representation 350 of the viewing area using an X-Y coordinate system 352. In this case, a different viewing zone 320-1 to 320-4 may be created for each row 322-1 to 322-4 of seats in the theater, and these viewing zones 320-1 to 320-4 can be defined by the X and Y coordinates of the X-Y coordinate system 352.

Calibrating to a Pre-Existing Model of the Viewing Area. In some situations, a pre-existing model of the viewing area may be available. Examples of such models include, but are not limited to, models of the interiors of a building, models of an outdoor venue, and/or models of cities. In such cases, the coordinate system of the viewing area may be set as the dimensions of the model or the real-world dimensions, and the sensing system need not be used to determine the dimensions of the viewing area.

An MV display installed at a venue can be calibrated to a pre-existing model of the venue with a calibration device comprising a camera and processor. To calibrate to an existing model of the viewing area to an MV system, the following example procedure can be performed. In step 1, the location of a desired calibration point viewing location in the model of the viewing area is identified. In step 2, the calibration device is positioned at the calibration point viewing location and oriented such that the MV display is within view of the calibration device camera. In step 3, patterns are flashed on the MV display to uniquely encode every beamlet of every multi-view pixel. In step 4, images of the MV display are captured using the calibration device camera. In step 5, the beamlet from each multi-view pixel that lands on the calibration device camera is identified using image processing and decoding techniques. In step 6, the beamlet and viewing location associations are recorded. In step 7, the calibration device is repositioned in other viewing locations in the viewing area, and steps 1-6 are performed for each of those viewing locations. In step 8, an approximate mathematical relationship between the beamlets and viewing locations is computed based on the recorded beamlet and viewing location associations.

Other well-known image processing techniques can also be used to calibrate the MV display to a pre-existing model. For example, a spatial sensing system, such as a stereoscopic camera, can be used. A registration between the stereoscopic camera and the pre-existing model may be performed. Known techniques for automatic 3D point cloud registration in image processing may be used to perform this registration. For example, a light source may be positioned in multiple known locations in the 3D model, with each location being detected by the stereoscopic camera. These multiple data points can be used to mathematically compute the registration parameters.

Pre-Calibration. The use of more complex mathematical models of the viewing area may increase the number of calibration points needed to accurately and precisely compute the model. In general, the more complex the model, the more accurate the mapping can be, but also the more calibration points are needed. If all of the calibration points are captured upon each installation of the MV display and sensor, the installation process may become cumbersome.

For example, to accurately compute the distortion of a multi-view pixel, it may be desirable to choose calibration points that sample the entire viewing area of the multi-view pixel. In certain cases, this may be a non-trivial task. For example, a multi-view lighting unit provided on a large building or other structure may be viewed across an entire city. As a result, a manual calibration of each viewing zone would require an operator to travel all around the city to capture sufficient calibration points. To reduce the number of calibration points required, the system may incorporate a model of how beamlets are geometrically arranged with respect to each other so that after finding the correspondences of a small number of beamlets, the rest can be calculated via the geometric model.

An example calibration procedure can be broken down into a two-phase process.

Phase 1: Pre-calibration. The purpose of the pre-calibration phase is to determine the geometric relationships among the beamlets of a single multi-view pixel to each other. This could be performed in a factory using the disclosed methods by calibrating to a known geometry such as a plane at a known location relative to the MV display. It may also be inferred from the opto-mechanical design of the multi-view pixels. For example, a certain lens configuration may produce a known radial distortion. It would be assumed that this pre-calibration remains valid even after installation in a venue. An example pre-calibration step can compute a mathematical model that undistorts the multi-view pixel's beamlet pattern. A similar pre-calibration step is often done in camera systems, where the intrinsic distortion characteristics of a camera lens system are precomputed and applied to undistort captured images.

Phase 2: Registration. In the registration phase, the geometric relations of a small number of beamlets to the viewing area after installation is determined. Using the results of pre-calibration, the geometry of the remaining beamlets with respect to the viewing area can then be estimated through interpolation and other mathematical techniques. Because pre-calibration has already been performed, fewer calibration points may be needed to compute the mathematical model between beamlets and viewing zones.

Coordinated Multi-View Display Experiences

In accordance with embodiments of the present invention, systems and methods are provided for coordinated experiences across multiple MV displays. As described above with respect to FIGS. 1A-1B, an MV display system 100 can be used to display targeted and/or coordinated versions of content on a plurality of MV displays in a shared viewing environment based on state information about the viewers. The system controller 152 is used to manage the MV displays 150a-150b, including the managing of viewer states, state transitions, and content assignments for the MV displays 150a-150b.

Figure 4:
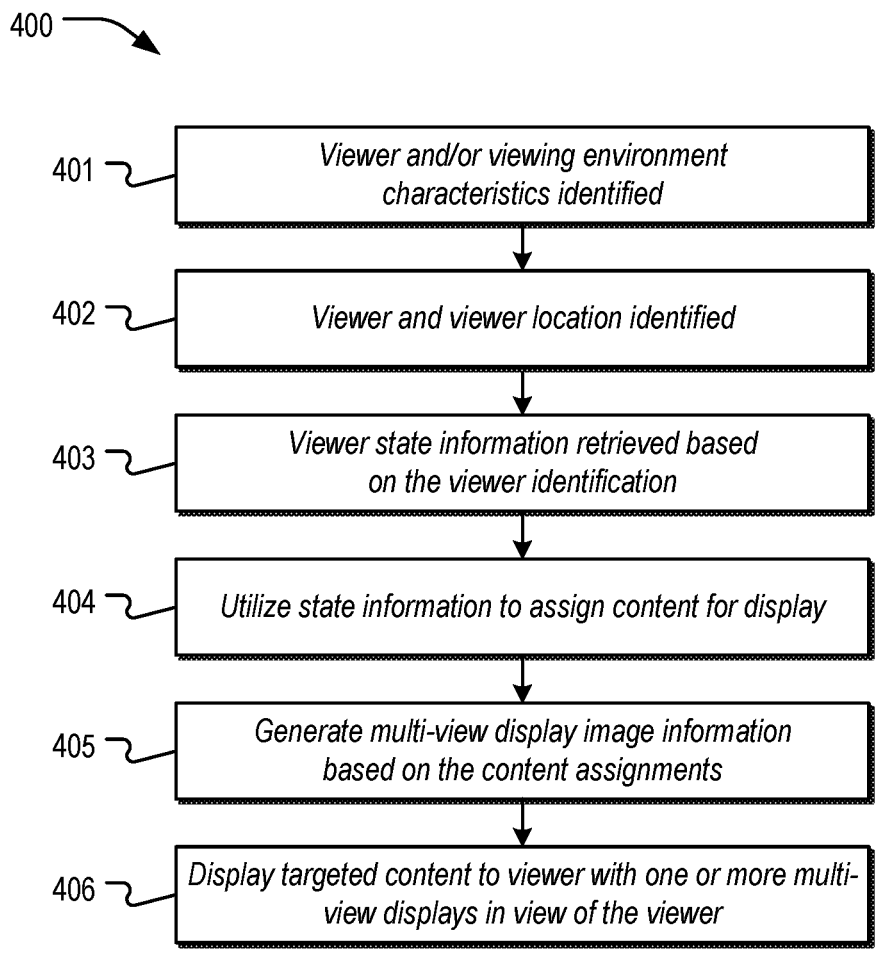
FIG. 4 is a simplified flowchart illustrating a method of operating a coordinated MV display system, in accordance with embodiments of the present invention.

FIG. 4 is a simplified flowchart illustrating a method 400 of operating the coordinated MV display system 100, in accordance with embodiments of the present invention. In step 401, the sensing system 154 detects various characteristics, such as, e.g., the viewing area, viewers present in the viewing area, and any other characteristics that may be pertinent to the states desired to be monitored by the system 100. As described above, the sensing system 154 may utilize any of a variety of sensing technologies, such as imaging devices 220, as described in the example above.

In step 402, one or more viewers 130 and their respective locations are identified based on the information received by the sensing system 154. This identification can be performed using a variety of technologies and/or external databases, such as using facial recognition technology to identify each viewer. In other examples, the controller 152 may utilize machine vision technology to identify various unique characteristics of each viewer (e.g., hair color, hair length, hair style, size and/or shape of various body parts, height, clothing colors, accessories, companions, mannerisms, behaviors, etc.), with or without having any specific identity information, such as their names or other pre-established identifiers. In addition, the controller 152 may determine each viewer's location within the viewing environment, based on the viewer's position relative to the known location of each sensing device 155 or relative to other physical characteristics of the environment (e.g., landmarks, stores, signs, etc.). As a result, as each viewer travels around the viewing environment (e.g., walks around the shopping mall environment 102) and images of the viewer are captured by various sensing devices 155 distributed throughout the environment, the viewer can be uniquely identified and distinguished from the other viewers in the viewing environment.

In step 403, the system controller 152 retrieves state information for one or more of the detected viewers. The state information may comprise, e.g., the locations through which the viewer has travelled, stores visited by the viewer, or purchases made by the viewer.

In step 404, the system controller 152 utilizes the state information about the one or more viewers to assign content to be displayed to the viewers by one or more MV displays 150 visible to each respective viewer. In the example described above with respect to FIGS. 1A-1B, the state information includes a list of stores visited by a first shopper 130a, and the system controller 152 analyzes this state information and generates content to be displayed to the first shopper 130a based on this state information.

In step 405, the system controller 152 generates MV display image information from the content assignments and determined viewer locations.

In step 406, the MV display image information is displayed to the viewer by a nearby MV display.

It is to be understood that the various functions described herein may be performed by any suitable computing systems. In some embodiments, these functions could be implemented using a single system controller 152, which is in communication with each of the MV displays 150. The single system controller 152 may store all of the content available for display, and perform the viewer identification, state information retrieval, assignment of content, and generation of MV display image information. The system controller 152 can then send the MV display image information to the applicable MV display for display to the viewer.

In other embodiments described in greater detail below, a dedicated controller may be coupled to each MV display, with all of the dedicated controllers being coupled to a central system controller. In these examples, the various functions described herein may be distributed among these devices, with some functions (e.g., the generation of MV display image information) performed by the dedicated controllers and other functions (e.g., the storage of state information, the management of state information, the assignment of content to a viewer, and/or the storage of content for display) performed by the central system controller. These various devices may collectively be considered as the system controller 152.

In some embodiments, all or a subset of possible content to be shown by the MV displays can be stored locally at each MV display. In these embodiments, the central system controller may store and maintain state information, identify the content to be displayed to the viewer, and transmit an associated content identifier to an MV display. The local controller for the MV display can then retrieve the actual content from local storage (e.g., a video of a product advertisement). This configuration may be desirable as it reduces the amount of data communications between devices in the network, since content identifiers could require far less storage and bandwidth for transmission than the actual content itself.

In some embodiments, the associations between state information and versions of content for display could be performed entirely by the local MV display controllers. The central system controller could optionally be used to store the current state information for each viewer. This could be advantageous in implementations where a cleaner separation of information between the various local MV display controllers is desired. In this case, the central system controller would manage the viewer state information, with the local MV display controllers handling the content assignment and content generation based on the state information received from the central system controller.

FIGS. 6A-6C and 7-9 are simplified block diagrams of MV systems illustrating other example system architectures, in accordance with embodiments of the present invention.

Figure 6A:
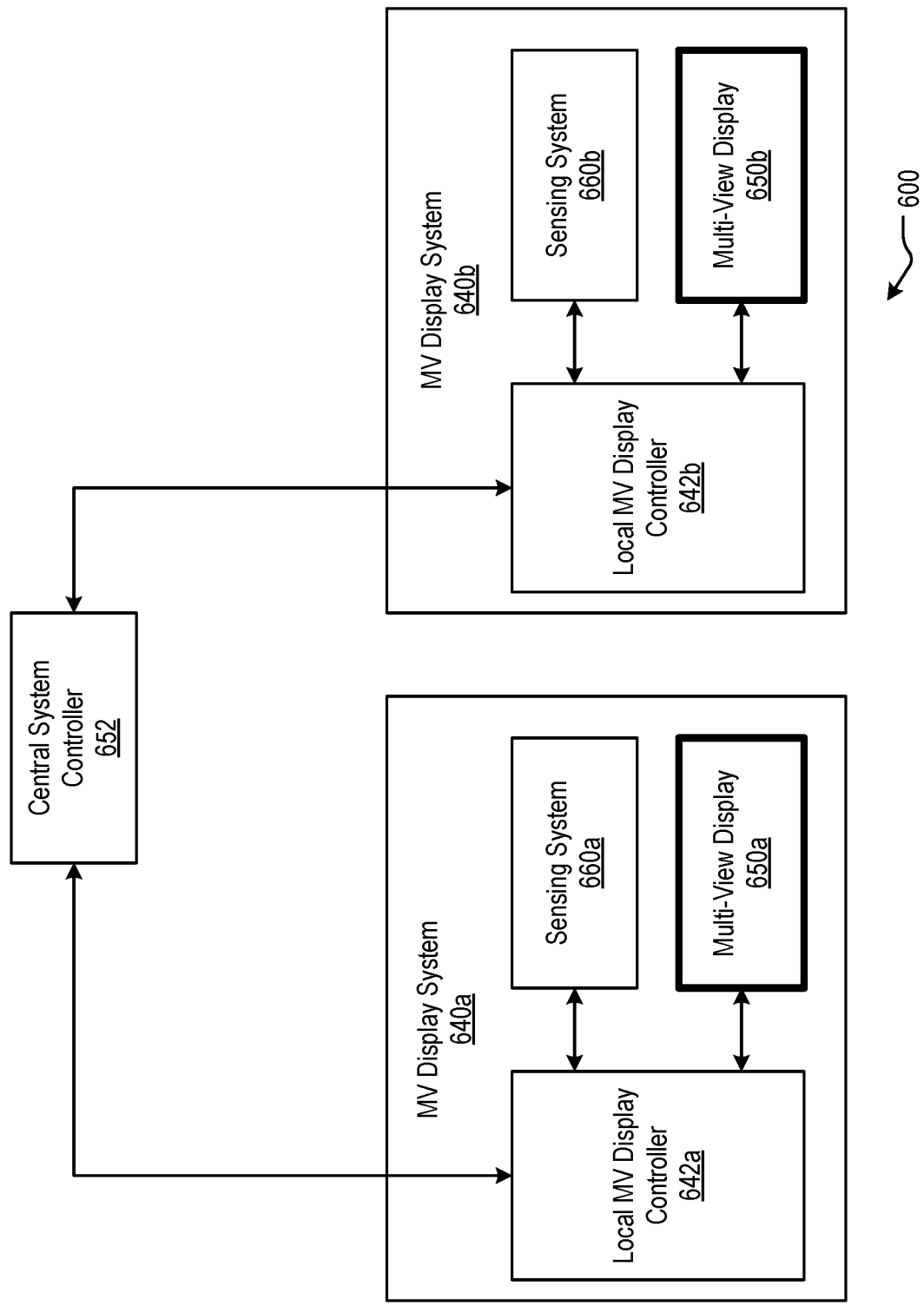
FIGS. 6A-6C are block diagrams of example MV systems having a central system controller and multiple local MV display controllers in accordance with embodiments of the present invention.

FIG. 6A illustrates an MV system 600 having a central system controller 652 in communication with multiple MV display systems 640, with each of the MV display systems 640 being provided with a corresponding local MV display controller 642 and MV sensing system 660. Each local MV display controller 642 can be implemented using any suitable combination of hardware and software, similar to the various possible implementations of the system controller 152 of FIG. 2. In one example, each MV display controller 642 comprises a general-purpose computer programmed to provide the desired functionality. In other embodiments, each MV display controller 642 comprises a computing device having a special-purpose processor for performing the desired functionality. The embodiment illustrated in FIG. 6A depicts an MV system 600 coupled with two MV display systems 640a-640b, but it is to be understood that any number of MV display systems 640 may be used. In addition, other components that might be provided as part of the MV system 600, such as, e.g., a content server and zone management device, are omitted for clarity.

In MV system 600, some portion of the functionality that would be provided by the system controller 152 in FIG. 2 is distributed among the central system controller 652 and the various MV display controllers 642a-642b. In addition, the functionality that would be provided by the sensing system 154 in FIG. 2 is distributed among the various MV sensing systems 660a-660b. For example, one or more of the following functionality performed by the system controller 152 may be performed by the MV display controllers 642a-642b: the identification of objects detected by the MV sensing systems 660a-660b, the determination of the locations of those objects, the retrieval of information about the detected viewers from an external database, the storage and updating of state information and other viewer profile information, the retrieval of content from external content server, the management and assignment of content for display on the MV displays 650, and/or the monitoring and management of viewing zones for each MV display 650.

In some embodiments, the MV display controller 642a generates video signals based on the versions of content to be displayed, and transmits those video signals to its corresponding MV display 650a. The MV display 650a, in turn, displays those versions of content to the various viewing zones corresponding to that MV display 650a. The other local MV display controllers 642 in the system 600 would operate in a similar fashion.

In some embodiments, the MV display controllers 642 do not store state information locally. Instead, when the sensing system 660a detects a viewer in the viewing area of the MV display system 640a and determines the viewer's identity, the local MV display controller 642 transmits a query to the central system controller 652 requesting the current state of that viewer and/or the versions of content that should be displayed to the viewing zone containing that viewer. In these embodiments, because the processing demands on the local MV display controllers 642 is lower than the central system controller 652, the local MV display controllers 642 may be implemented using simpler, less expensive computing hardware.

In some embodiments, state information about viewers is stored locally by each MV display controller 642. In some embodiments, the state information for all of the viewers in the viewing environment of the system 600 is replicated and stored locally by each MV display controller 642a-642b, as well as the central system controller 652. In other embodiments, each MV display controller 642 may store only the state information for a subset of the total viewers known by the system 600 and stored by the central system controller 652. For example, the MV display controller 642a may only store the state information for viewers that are currently in the viewing area for that MV display system 640a. The state information for other viewers in the viewing environment outside of the viewing zone for the MV display system 640a is not stored locally by the MV display controller 642a, and is instead stored in the central system controller 652 and, if the viewer is inside the viewing zone of the second MV display system 640b, the state information would be stored by that second MV display controller 642b. Because the MV display controller 642 can locally retrieve the state information and, optionally, the versions of content to display to each viewer, the latency between viewer detection and rendering of the targeted version of content may be reduced, as compared to embodiments in which the local MV display controller 642 transmits queries regarding the state information to the central system controller 652 over a network. Each time one of the MV display systems 640 detects a state change for a viewer, that state change is transmitted to the central system controller 652, which stores that state information and also transmits an update regarding that state change to the other local MV display controllers 642 in the system 600, thereby maintaining current state information at all MV display systems 640.

As described above, this distributed control architecture utilizing local processing performed by the MV display controllers may advantageously reduce the amount of network traffic and data transmissions between the system controller and the various MV displays. In addition, providing each MV display system 640 with its own control and sensing systems may provide a more modular architecture, enabling more rapid deployment of additional MV displays.

Figure 6B:
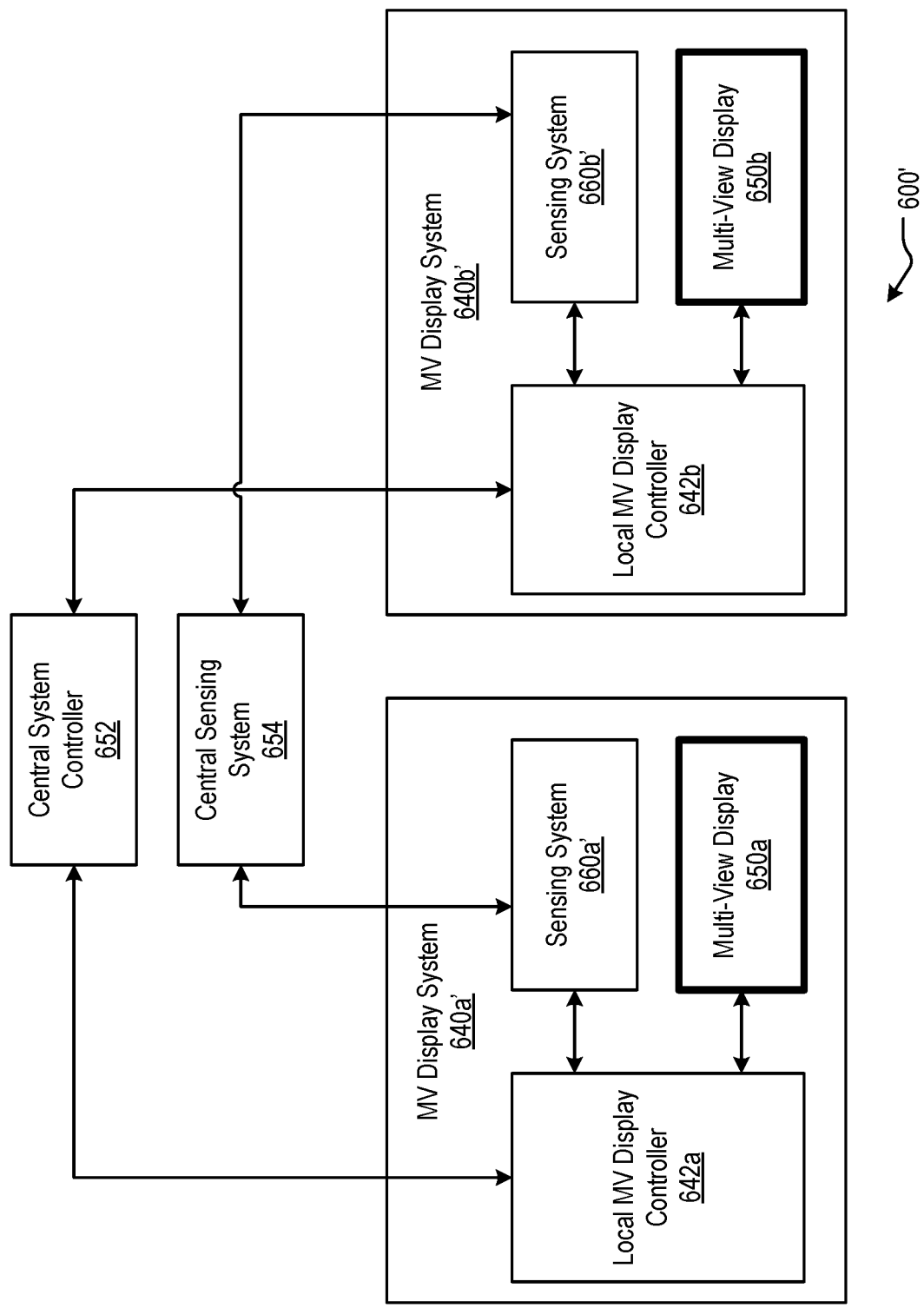

FIG. 6B illustrates an alternative MV system 600' coupled with two MV display systems 640a'-640b', but with the addition of a central sensing system 654. In this embodiment, the central sensing system 654 may perform a portion of the functionality performed by the local MV sensing systems 660a'-660b' in FIG. 6A. In some implementations, machine vision and other tasks may require high levels of data processing, which could be performed more efficiently and/or inexpensively using a central sensing system 654. In some embodiments, the local sensing systems 660a'-660b' may detect viewers in the viewing area of the corresponding MV display 650, and will transmit the images of those viewers to the central sensing system 654, which can perform feature extraction, object recognition, and/or other image processing operations on those images in order to generate identifying information about that viewer. In other embodiments, one or more of those image processing operations, such as, e.g., the feature extraction from the images of the viewers, may be performed by the local sensing systems 660a'-660b', which then transmit the results of those image processing operations to the central sensing system 654, which can perform the remaining operations to generate identifying information about that viewer.

Figure 6C:
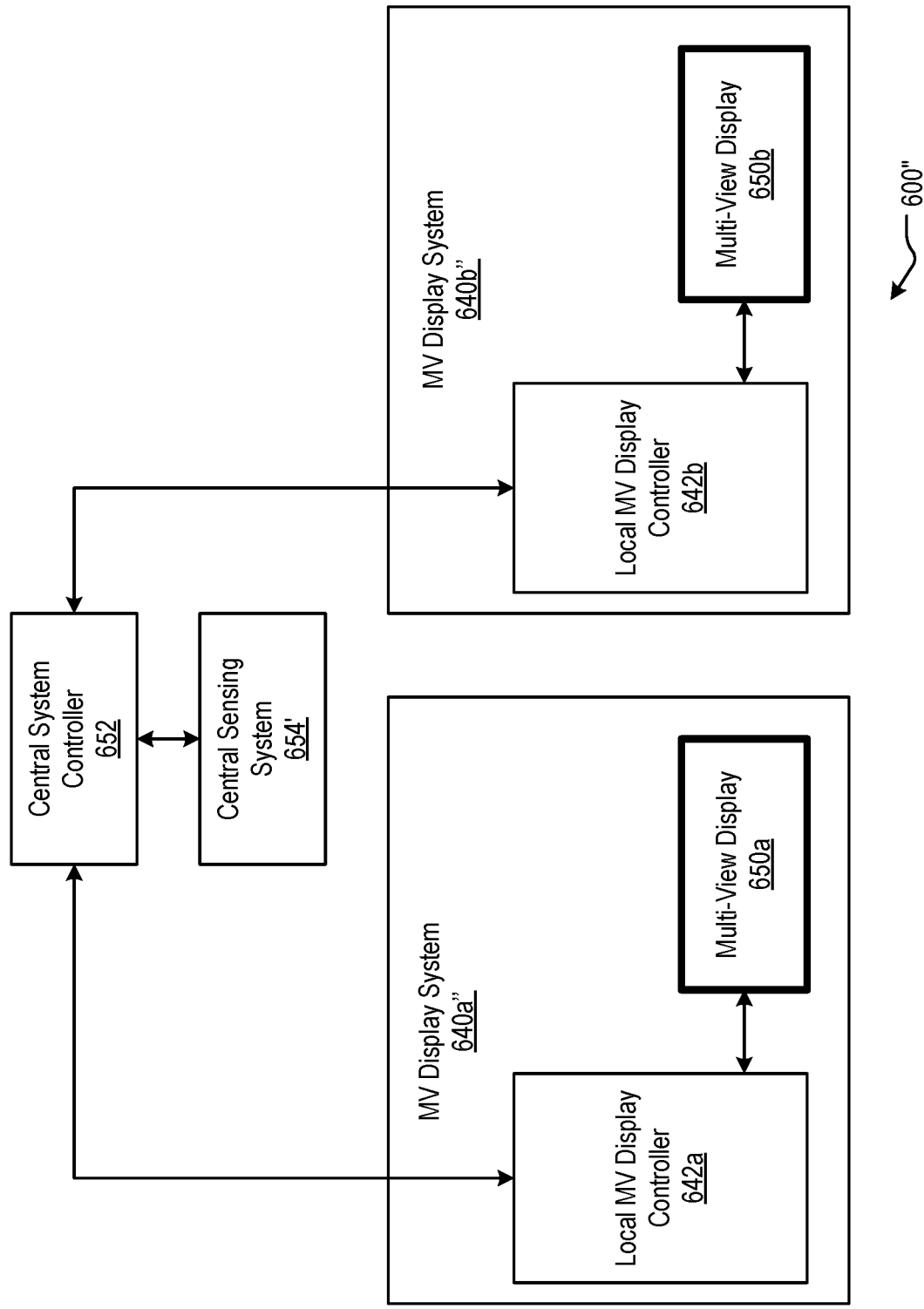

FIG. 6C illustrates an alternative MV system 600" coupled with two MV display systems 640a"-640b", but utilizing a central sensing system 654' in place of the distributed local MV sensing systems 660a'-660b' in FIG. 6B. In this example, the central sensing system 654' would provide similar functionality as the sensing system 154 in FIG. 2, but the MV display controllers 642a"-642b" would still provide distributed local control over the MV displays 650a"-650b".

Figure 7:
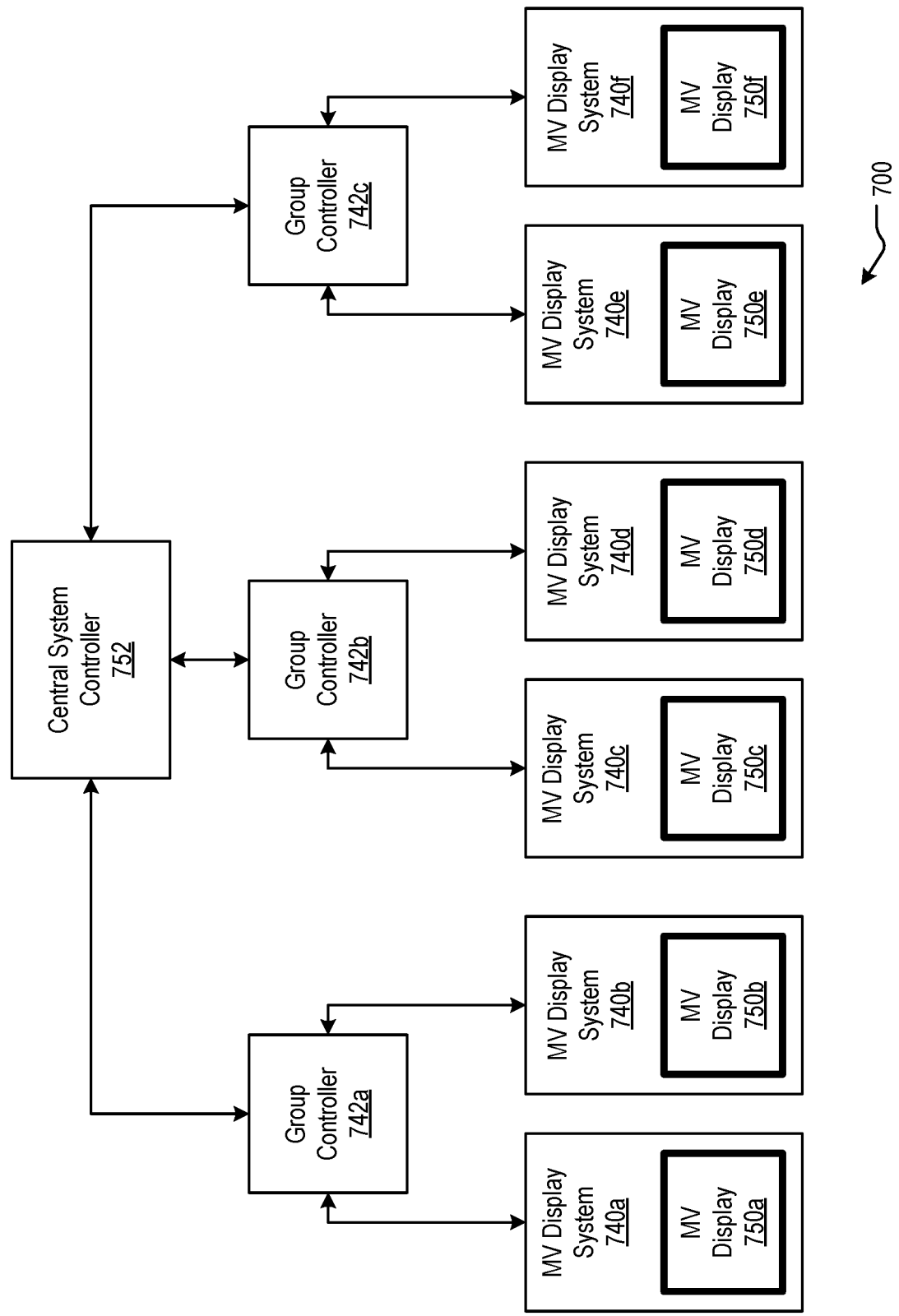
FIG. 7 is a block diagram of an example MV system utilizing multiple group controllers in accordance with embodiments of the present invention.

FIG. 7 illustrates an MV system 700 having a central system controller 752 in communication with multiple group controllers 742a-742c, with each group controller 742a-742c in communication with one or more MV display systems 740. Each MV display system 740a-740f includes a corresponding MV display 750a-750f. Each group controller 742a-742c can be implemented using any suitable combination of hardware and software, similar to the various possible implementations of the system controller 152 of FIG. 2 and MV display controller 642 of FIG. 6A. However, in this example, each group controller 742 provides the functionality provided by the individual MV display controllers, as in FIGS. 6A-6C, but for multiple MV displays. The use of a group controller 742 to replace multiple MV display controllers can decrease the overall cost of the MV system 700 from MV system 600 by reducing the number of computing devices needed to manage the MV displays, while providing a similar distributed control architecture as MV system 600. Some embodiments of this MV system 700 may be advantageous if there is a large number of MV display systems 740, which might overburden a single central system controller 752. The group controllers 742 may reduce the load on the system controller 752 by performing some of those functions. These embodiments may also be advantageous when the MV display systems 740 are deployed across a large geographic area, in which case network communications between a central system controller and the MV display systems may become undesirably slow. Instead, a group controller 742 may be provided for controlling those MV display systems 740 that are located in close physical proximity to the group controller 742. This might be useful for an organization having multiple sites in different cities. Each site may be provided with its own group controller 742, with the central system controller 752 located in the organization's headquarters or data center providing centralized management and coordination between the various group controllers 742.

In MV system 700, a central sensing system, similar to sensing system 154 in FIG. 2, may be used. Alternatively, multiple local sensing systems may be used, similar to sensing system 660 in FIG. 6A. In this case, a local sensing system may be implemented in each MV display system 740 or may be implemented in each group controller 742.

Figure 8:
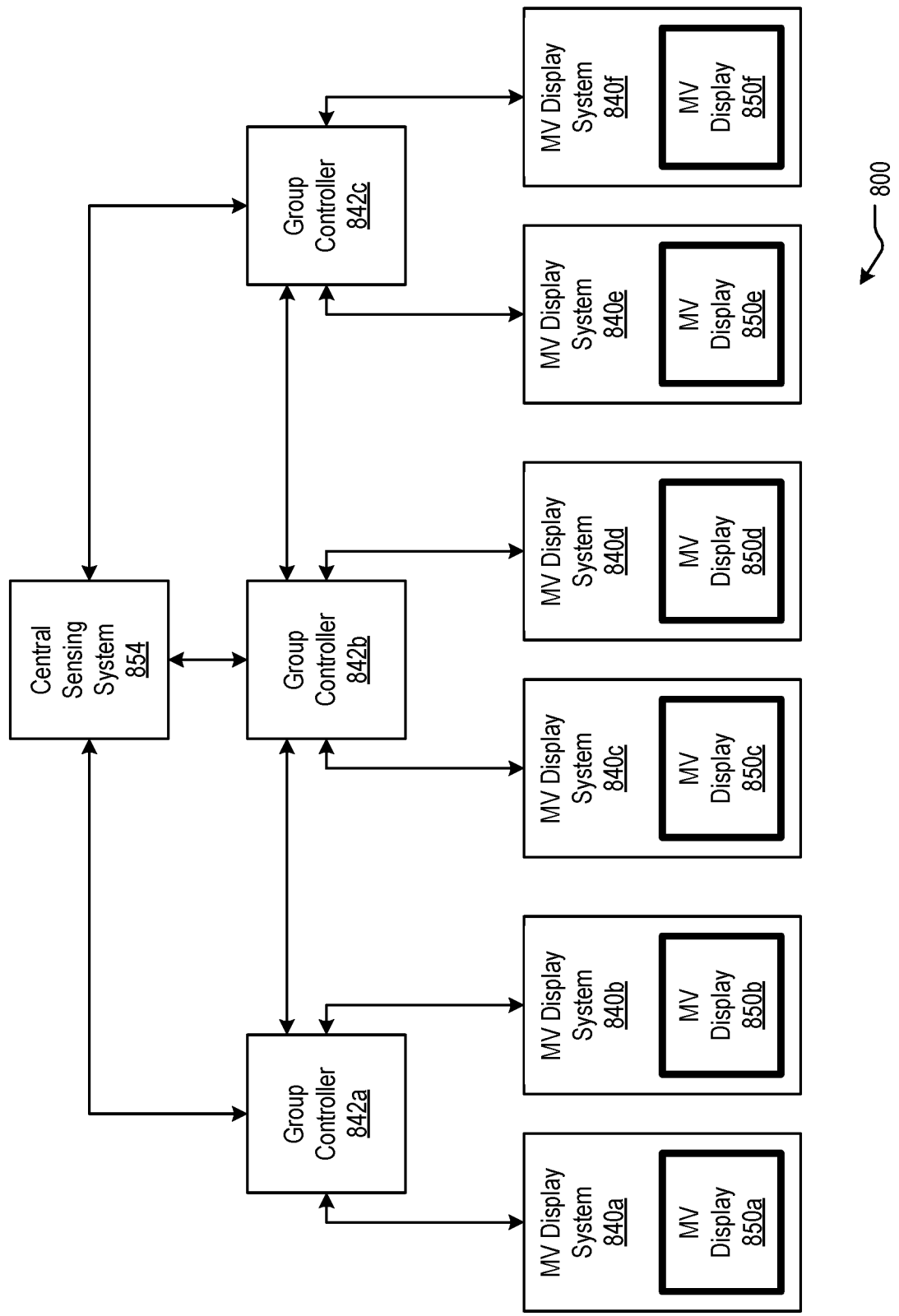
FIG. 8 is a block diagram of an example MV system utilizing a partially distributed control architecture in accordance with embodiments of the present invention.

FIG. 8 illustrates an MV system 800 that does not incorporate a central system controller, as in FIGS. 6A and 7. Instead, the MV system 800 provides a distributed control architecture with multiple group controllers 842a-842c, each group controller 842a being coupled to one or more MV display systems 840a-840f. Each MV display system 840a-840f includes a corresponding MV display 850a-850f. The MV system 800 can be implemented using a mesh network architecture in which each node, e.g., each group controller 842a-842c, relays data and messaging to the other group controllers 842a-842c in the MV system 800. This architecture may be desirable because it eliminates the need for a central system controller than can scale to manage large numbers of MV displays. In some embodiments, additional group controllers 842 may be added to the MV system 800 over time while avoiding an overload of a central controller or avoiding the need to upgrade the central controller.

In some embodiments, one of the group controllers 842 operates as the master controller for the system 800, and provides the overall management of all of the group controllers 842a-842c in the system 800. In other embodiments, there is no master controller and, instead, the control functions are distributed across all of the group controllers 842a-842c. In some embodiments, each of the group controllers 842 locally stores all of the viewer state information, with that information being mirrored across all of the group controllers 842. In other embodiments, one or more of the group controllers 842 may locally store only a subset of the state information. In these embodiments, when one of the group controllers 842 attempts to retrieve state information that is not locally stored, it will retrieve that state information from one of the other group controllers 842. In some embodiments, each group controller 842 may be provided with a database that can direct the group controller 842 to the other group controller 842 storing the desired state information. In other embodiments, each group controllers 842 may be configured to transmit a query to the other group controllers 842 requesting the desired state information. This implementation may be advantageous if the total database of state information may be too large to efficiently store in a single node (e.g., a single group controller 842) of the system 800. In this case, distributing the state information database across multiple group controllers 842 may be more manageable. For example, if group controller 842a is geographically located far from group controller 842b, then it may be assumed that it is unlikely for viewers present in the viewing areas of MV display system 840a or 840b to also be detected in the viewing areas associated with group controller 842b (e.g., MV display systems 840c or 840d) in the same timeframe. In this case, the state information for those viewers can be stored in group controller 842a and need not be stored by group controller 842b. However, if one of those viewers does travel to a viewing area associated with group controller 842b, group controller 842b can request the state information for that viewer from group controller 842a.

In MV system 800, a central sensing system 854, similar to sensing system 154 in FIG. 2, may be used. The sensing system 854 may be coupled to each of the group controllers 842a-842c to provide each group controller 842a-842c with information regarding detected viewers and environmental conditions. In other embodiments, multiple local sensing systems may be used. In this case, a local sensing system may be implemented in each MV display system 840 or may be implemented in each group controller 842.

Figure 9:
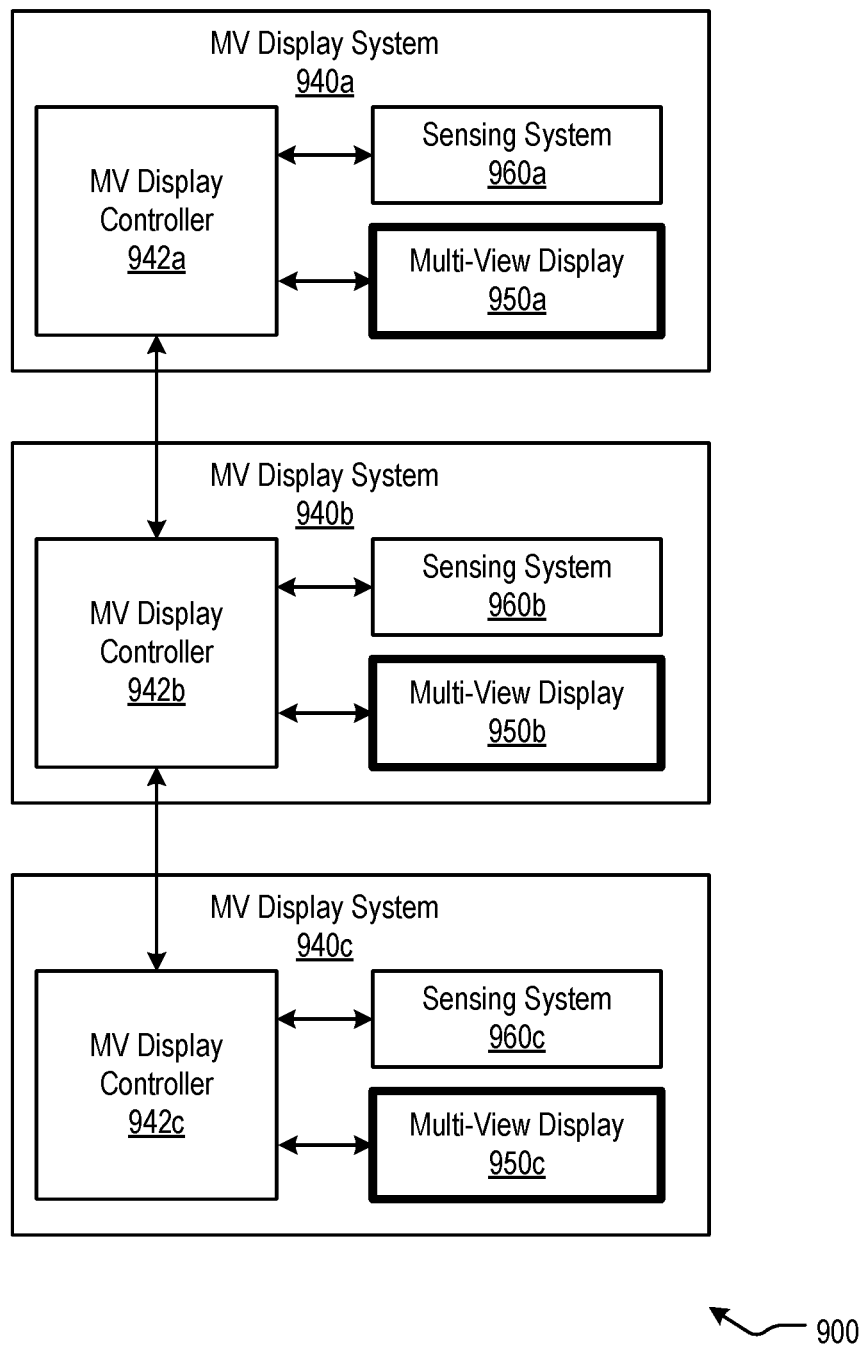
FIG. 9 is a block diagram of an example MV system utilizing a fully distributed control architecture in accordance with embodiments of the present invention.

FIG. 9 illustrates an MV system 900 which is similar to the MV system 600 in FIG. 6A, but eliminates the central system controller 652. MV system 900 utilizes a fully distributed architecture in which there is no centralized control or sensing. Instead, each MV display system 940a-940c includes a local MV display controller 942a-942c, a local sensing system 960a-960c, and an MV display 950a-950c. In contrast with the MV system 600 in FIG. 6A, in which the control functionality is divided between the central system controller 652 and the local MV display controllers 942a-942c, all of the control functionality in MV system 900 is provided by the local MV display controllers 942a-942c. Each local MV display controller 942 provides the state management functionality for its MV display system 940, in addition to performing the viewer detection, viewer identification, content assignment, and rendering operations for displaying the content on the corresponding MV display 950. Although MV system 900 is depicted in FIG. 9 in a daisy chain configuration, in other embodiments, different network topologies may be used, such as, e.g., bus, star, ring, mesh, tree, or hybrid.

The MV system 900 can be implemented using a mesh network architecture in which each node, e.g., each MV display system 940a-940c, relays data and messaging to the other MV display systems 940a-940c in the MV system 900. This architecture provide an even more distributed architecture than the MV system 800 in FIG. 8, and can provide many of the same advantages as the mesh topology of MV system 800, with each MV display system 940a-940c being capable of rapid and independent operation, without the latencies resulting from network communications, while still providing viewer and state information to the other MV display systems 940a-940c in the system 900. In some embodiments, this architecture may be desirable as it may eliminate the need for and complexity of utilizing group controllers.

Examples of calibration systems and processes are described above. With respect to the embodiments shown in FIGS. 6A-6C, 7, 8, and 9, it is to be understood that the systems and methods for calibrating these MV systems may vary. For instance, if the viewing zones for each MV display are initially specified with reference to a coordinate system defined relative to the sensing system, the beamlet coordinate system of the MV display may be calibrated to the coordinate system defined relative to the sensing system. The coordinate systems defined relative to the sensing system may vary, depending on the locations of the various sensors of the sensing system and the architecture of the sensing system, such as, for example, a distributed sensing system (e.g., distributed sensing systems 660a-660b in FIG. 6A), a central sensing system (e.g., central sensing system 654' in FIG. 6C), or a hybrid sensing system (e.g., central sensing system 654 and local sensing systems 660a'-660b' in FIG. 6B).

In embodiments having distributed sensing systems (e.g., as shown in FIG. 6A) or hybrid sensing systems (e.g., as shown in FIG. 6B), each MV display 650a-650b may be calibrated to a local coordinate system relative to its corresponding local sensing system 660a-660b or 660a'-660b'. In embodiments having a centralized sensing system (e.g., as shown in FIG. 6C), the viewing zones may be defined relative to a central coordinate system covering the viewing areas for all of the MV displays 650a-650b, so each MV display 650a-650b may be calibrated to the same coordinate system.

State Monitoring and State Transitions. As described above, the MV display system 100 is configured to maintain state information about the targets travelling through the viewing environment. For example, the sensing system 154 may be configured to detect viewer characteristics, activity, and/or location information and transmit this information to the system controller 152. Other types of state information may be transmitted to the system controller 152 by other systems. For example, shopper purchasing activity may be transmitted to the system controller 152 by a point-of-sale (POS) system at the stores visited by the viewer/shopper. The system controller 152 can then utilize this received state information to update the stored state of the viewer/shopper and then assign content for display to the viewer/shopper based on the current state.

Figure 5:
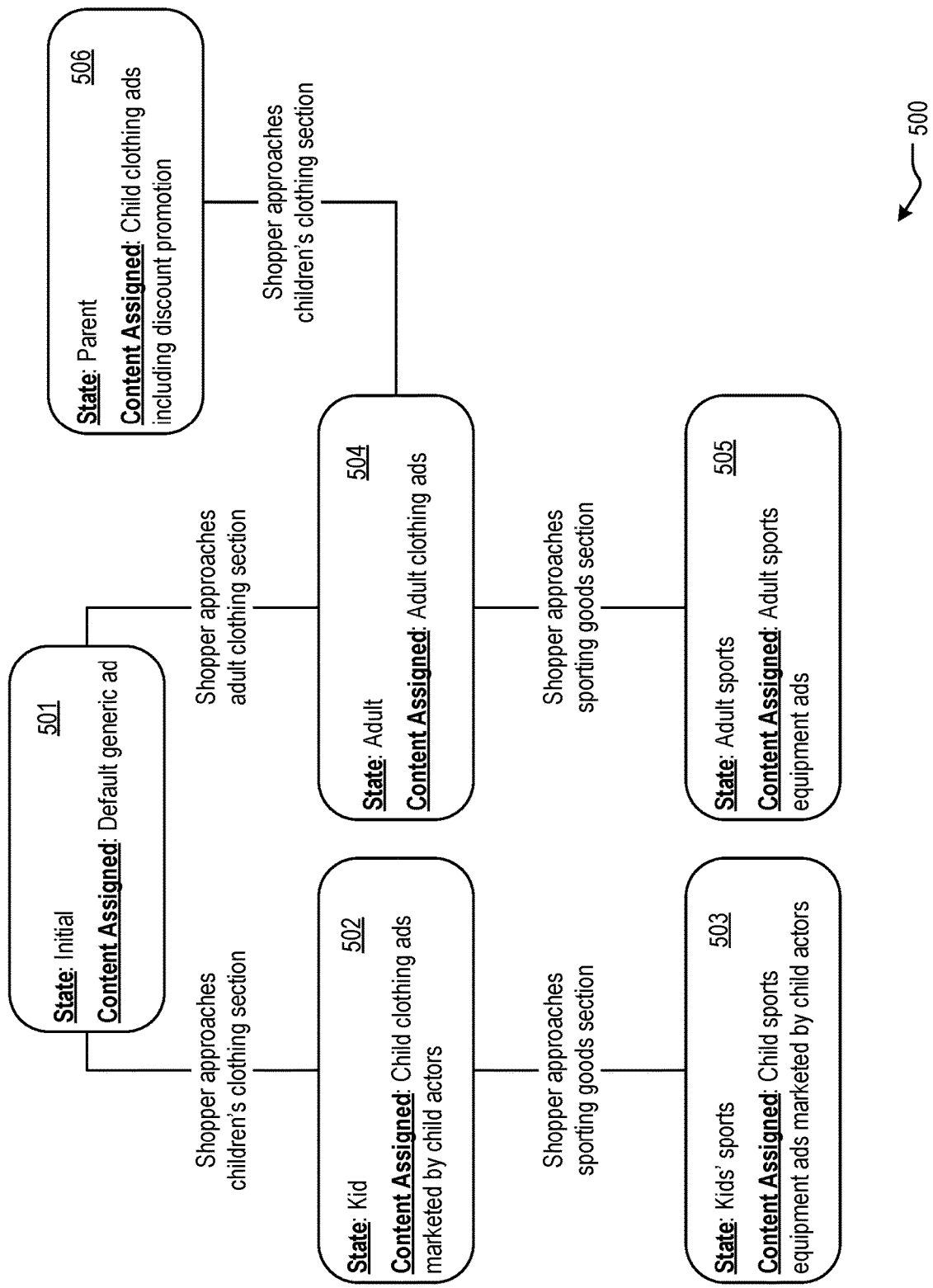
FIG. 5 is a state diagram 500 illustrating a simple state monitoring process in accordance with embodiments of the present invention.

FIG. 5 is a state diagram 500 illustrating a simple state machine for monitoring shoppers in a department store, in accordance with embodiments of the present invention. When a shopper first enters the store, the shopper is uniquely identified and assigned state 501, which corresponds to an initial, default state. This state is associated with that shopper and stored by the system controller 152, which assigns a default generic advertisement to be displayed to the shopper on an MV display in view of the shopper at the entrance of the store.

If the sensing system 154 detects that the shopper is approaching the children's clothing section, that viewer identity and location information is transmitted to the system controller 152, which updates the stored state of the shopper to state 502, which corresponds to a "Kid" state. This "Kid" state indicates that the MV system 100 has tentatively concluded, e.g., from sensor inputs and predictive algorithms, that the viewer is likely to be a child and therefore assigns versions of content suitable for and targeted to children. The system controller 152 then updates the content assigned for display to the shopper to child clothing advertisements marketed by child actors. The system controller 152 then transmits the assigned content (e.g., the child clothing advertisement) to an MV display located in the children's clothing section. As described above, MV displays are configured to display different versions of content simultaneously to multiple users by targeting the display of content to particular users occupying viewing zones within the viewing area of the MV display. Accordingly, the MV display then displays that newly assigned advertisement to the viewing zone in which the shopper is located. The sensing system 154 can be used to monitor the shopper's movement through the children's clothing section so that the content assigned to that shopper is continuously displayed to a moving viewing zone containing the shopper as the shopper walks through the children's clothing section.

If the sensing system 154 then detects that the shopper has left the children's clothing section and is now approaching the sporting goods section, that viewer identity and updated location information is transmitted to the system controller 152, which updates the stored state of the shopper to state 503, which corresponds to a "Kids' sports" state. This "Kid's sports" state indicates that the MV system 100 has tentatively concluded that the viewer is likely to be a child interested in sports, and therefore assigns content suitable for and targeted to children interested in sports. The system controller 152 then updates the content assigned for display to the shopper to child sports equipment advertisements marketed by child actors. The system controller 152 then transmits the assigned content (e.g., the child sports equipment advertisements) to a third MV display located in the sporting goods section. The third MV display then displays that newly assigned child sports equipment advertisement to the viewing zone in which the shopper is located.

Alternatively, if the shopper in state 501 is detected as approaching the adult clothing section, then the system controller 152 updates the shopper's state to state 504, which corresponds to an "Adult" state. This "Adult" state indicates that the MV system 100 has tentatively concluded that the viewer is likely to be an adult, and therefore assigns a version of content for adults. The system controller 152 then updates the version of content assigned for display to the shopper to adult clothing advertisements. The system controller 152 then transmits the assigned version of content (e.g., the adult clothing advertisements) to a fourth MV display located in the adult clothing section. The fourth MV display then displays that newly assigned adult clothing advertisement to the viewing zone in which the shopper is located.

If the sensing system 154 then detects that the shopper has left the adult clothing section and is now approaching the sporting goods section, that viewer identity and updated location information is transmitted to the system controller 152, which updates the stored state of the shopper to state 505, which corresponds to an "Adult sports" state. This "Adult sports" state indicates that the MV system 100 has tentatively concluded that the viewer is likely to be an adult interested in sports, and therefore assigns versions of content suitable for that demographic. The system controller 152 then updates the version of content assigned for display to the shopper to sports equipment advertisements targeted to adults. The system controller 152 then transmits the assigned version of content (e.g., the adult sports equipment advertisements) to the MV display located in the sporting goods section. The MV display then displays that newly assigned adult sports equipment advertisement to the viewing zone in which the shopper is located.

Alternatively, if, instead of travelling from the adult clothing section to the sporting goods section, the shopper travels from the adult clothing section to the children's clothing section, the system controller 152 will update the stored state of the shopper to state 506, which corresponds to a "Parent" state. This "Parent" state indicates that the MV system 100 has tentatively concluded that the viewer is likely to be a parent, and therefore assigns versions of content suitable for that demographic. The system controller 152 then updates the version of content assigned for display to the shopper to children's clothing advertisements including a sales discount promotion. The system controller 152 then transmits the assigned version of content for display to the shopper by the MV display located in the children's clothing section.

Because system controller 152 stores the viewer states and coordinates control of all of the MV display systems throughout the store, events for a viewer occurring at one MV display can affect the content to be seen by that viewer when that viewer is near a different MV display. In other embodiments, multiple system controllers can operate in conjunction to update viewer states and control of the MV display systems.

It is to be understood that state diagram 500 is merely a simplified example and that other types of state machines may be used to monitor and update the state information associated with each viewer.

Retail Example One. In another example embodiment, the managers of a retail shopping mall would like to provide targeted content (e.g., advertising, information, directions) to shoppers in the mall. To this end, an MV display system 100 including sensing system 154, MV displays 150, and supporting elements are distributed throughout the mall.

When a shopper enters the mall, the shopper is detected by the camera-based sensing system as an unknown and unidentified object. The system assigns the Object A1 an identifier, e.g., "Object A1," and distinguishing features are collected by the sensors and associated with the Object A1, e.g., Object A1's overall size, shape, height, facial features, colors, patterns, articles of clothing, mannerisms, behaviors, cell phone signal, and use of a stroller, wheelchair, cane, crutches, or walker. In some embodiments, the sensing system 154 provides a sufficiently dense and expansive sensing coverage such that Object A1 can be tracked with continuity techniques, whereby the sensing system maintains constant visual contact of the Object A1 as the Object A1 moves through the mall. In other embodiments, the system can use logic and expected trajectories to estimate the movement of Object A1 whenever there is a break in sensing coverage as Object A1 transitions from one sensor to another.

As Object A1 travels through the mall, the sensing system might identify and collect additional features or characteristics to better identify it. For example, the sensing system may detect the acquisition of shopping bags by Object A1 or coordinated movement with other objects.

The system may search a shopper database (either within the system 100 or from an external server) to determine whether the sensed characteristics or features of Object A1 match the characteristics or features of other objects that have previously visited the mall and been detected by the system. In some embodiments, the object can be linked to the identity of a known person based on the object's actions in the mall, such as, e.g., use of credit cards, loyalty cards, mobile phones, or a check-in process. In some embodiments, the object can be linked to an identity by facial recognition, voice recognition, or gesture recognition. In some embodiments, the object can be matched with known characteristics of objects at detected other locations. For example, the sensed characteristics or features profile of Object A1, may closely match a profile of another Object X1 detected at another location, such as a different shopping mall. The profiles of Object A1 and Object X1 may then be linked and the information from both Object A1 and Object X1 can be used to assign targeted versions of content to Object A1. In addition, if the profile of Object X1 includes identity information about Object X1 (e.g., a name, phone number, loyalty card, etc.), that identity information can also be linked to Object A1. The profile information about objects from multiple environments can be stored in a central database accessible by multiple parties (e.g., all subscribers to the database), for use in other MV display systems and/or other conventional forms of advertising, outreach, or communication. In other embodiments, each MV display system may retain its own database of viewers, which can be updated with information retrieved from other databases.

As described above, the object may be identified by an identification device carried by the object, such as, e.g., an identification badge. The identification device can be associated with the shopper's identity by the shopper manually entering his or her identity information, e.g., into a registration kiosk or directory, during a transaction, or through some other means. This identity may be in the form of the shopper's name, as a profile, with a designation, or a checklist of interests, for example.

With the ability to track Object A1, the system can attempt to provide Object A1 with targeted content displayed on the mall's MV displays. This process may be simplified or provide more accurate personalization if the shopper actively requests the type of content it wants to see on MV displays, or if the shopper's interests can be derived from the shopper's profile or other information known about the shopper.

For instance, the system may determine that Object A1 has stopped at several locations to look at sunglasses. Using this information, the MV displays in front of shops that carry sunglasses may show content specifically to Object A1 regarding discounts on sunglasses, the brands of sunglasses featured in the store, sunglass services, or a coupon code for sunglasses. As shown in FIG. 1B, Object A1 is the second shopper 130*b* and is passing by a mall directory 161 comprising an MV display 150*c*. When the sensing device 155*c* adjacent to MV display 150*c* detects Object A1, all of the locations offering sunglasses may be highlighted on the map or list displayed to Object A1 on the MV display 150*c*. The MV display 150*c* may also provide wayfinding or navigational signage to emphasize directions to sunglass retailers. Because the content displayed to Object A1 is targeted for display only to Object A1, other shoppers in view of the mall directory 161 will not see the highlighted sunglass stores displayed to Object A1. Instead, the MV display 150*c* can display a default map to those other shoppers, or display personalized maps to each of those shoppers based on the known state information specific to each shopper.

To achieve this, the system may tag Object A1 as a target for sunglass advertisements based on Object A1's behavior (e.g., passively acquired information), or Object A1's stated preferences (e.g., actively acquired information). When the sensing system detects that Object A1 is in the proximity of shops that carry sunglasses, MV displays near the shops might create a "sunglass ad viewing zone" around Object A1. MV display directories and wayfinding signage throughout the mall may also establish viewing zones around Object A1 from which content about finding the location of sunglass retailers may be seen.

In some embodiments, the state information maintained by the system about Object A1 can include whether Object A1 had previously passed a particular MV display. As a result, if Object A1 passes the same MV display several times, the content displayed to Object A1 on that MV display might be refreshed, modified, or switched from what had been previously been displayed to Object A1. This can provide an improved experience for the shopper and more effective marketing for the advertiser.

In some embodiments, the sensing system may be configured to determine an object's distance from an MV display to ensure that the content displayed to the object is readable at that range. The system may enlarge or reduce the size of the content being displayed on the MV display to that object based on the determined distance. The sensing system may further be configured to determine the object's speed and direction as it passes the MV display to measure if the displayed content is having the desired impact. For example, if a shopper's velocity slows as the shopper passes by the MV display and/or if the shopper's direction of movement shifts in the direction of the MV display, it can be inferred that the shopper is engaging with the content shown on the MV display. Alternatively, if the shopper's velocity remains unchanged or increases as the shopper passes by the MV display and/or the shopper's direction of movement shifts away from the MV display, it can be inferred that the shopper is not engaging with the content shown on the MV display. Based on the object's detected speed and direction of travel, the system may refine, supplement, or change the content based on the shopper's apparent interest in slowing down and reading the content or the shopper's apparent lack of interest in ignoring the content.

As described above, there are a variety of obstacles that may prevent the delivery of targeted content as described above from being implemented using conventional displays instead of MV displays. If numerous objects (e.g., shoppers) are within the sightline of a conventional display that is showing content targeted to the interests of one of the shoppers, the interests of the other shoppers will be neglected. For example, shoppers not interested in sunglasses will be inundated with useless information (e.g., ineffective advertising content) whenever Object A1 is in the viewing area of a conventional display and sunglass advertisements are displayed on the display to target Object A1's interests.

In accordance with embodiments of the present invention, MV displays can address these obstacles to provide effective personalized content to viewers. As described above, each MV display has a total viewing area from which the MV display may be seen, similar to conventional displays. However, MV displays can be used to subdivide this total viewing area into multiple distinct viewing zones, each with a different version of content that may only be seen from that viewing zone. As a result, multiple versions of content may be simultaneously seen on a single MV display, with a unique and personalized version of content available for viewing by anyone looking at the MV display from each viewing zone. The sizes, shapes, and locations of these viewing zones can be predetermined and fixed, which may be useful in environments in which viewers congregate in known locations (e.g., in a theater). In other embodiments, the viewing zones can be dynamic such that the size, shape, and/or location of the viewing zone can be continually modified to encompass an individual as the individual travels within an MV display's viewing area. With reference to the example shown in FIG. 1B, as the first shopper 130a travels in the wide viewing area of the second MV display 150b in the storefront of Store 1, the first shopper 130a is encapsulated within a narrow viewing zone 122c. Anyone located in the viewing zone 122c and looking at the second MV display 150b would see only versions of content related to the determined interests of the first shopper 130a, e.g., shoes. Other shoppers within the viewing area of the same MV display 150b may be located in other narrow viewing zones to which versions of content targeting those shoppers (e.g., unrelated to shoes) is displayed.

In accordance with embodiments of the present invention, the one viewer state transition may be triggered when a viewer has purchased the item which had been previously displayed to that viewer on the MV displays, e.g., after the first shopper 130a has purchased shoes at one of the stores in the shopping mall. After this viewer state transition is detected, the system may reset or change the viewer state so as to begin displaying different types of content to the first shopper 130a. Similarly, if the system determines that the viewer has passed a predetermined number of shops or MV displays advertising a particular item without purchasing that item, or has shopped for a predetermined period of time without purchasing that item, the system may infer that the viewer is not interested in that item and therefore change the versions of content being displayed to that viewer.

As described above, the system may passively determine the version of content to be shown to a particular viewer on the MV displays based on inferences made in response to information gathered or sensed about the viewer. In some embodiments, the viewer may actively interact with the system to request certain types of content or to provide feedback on the content that has already been displayed to that viewer. The system can then change the version of content for display based on the viewer's inputs.

In embodiments in which the system passively assigns versions of content for display to a viewer, the system may use an algorithm based on the viewer's behavior to determine the version of content to assign for display. For example, the system may include an object recognition component programmed to identify objects travelling with the viewer that suggest the viewer is travelling with a baby or a small child. This object recognition may detect any of a variety of characteristics of an object in order to make this identification, such as, e.g., the size and shape of an object that corresponds to a baby or small child's body or an object being pushed by the viewer that has the size and shape of a baby stroller. If the object recognition component concludes that the viewer is likely to be travelling with a baby or small child, the profile of the viewer may be updated with that information and the system may passively assign baby or child-related content for display to the viewer. In other embodiments, the system may be configured to identify predetermined patterns of behavior that suggest an interest in a particular item or service. For example, the system may assign versions of content related to products the viewer has investigated in the shopping mall.

In some embodiments, the viewer's behavior after viewing content on an MV display can be used to evaluate, validate, or invalidate the content selected for display to the viewer. This analysis can then be used to modify the versions of content later displayed to the viewer. The system may be configured to validate the content assignment if the viewer appears to have been influenced by the version of content shown to the viewer on the MV display. For example, if an advertisement for a particular store is shown to the viewer on the MV display, and then the viewer subsequently visits that store, the content selection of that store's advertisement can be validated and perhaps reinforced. On the other hand, if the viewer does not visit that store after being shown the advertisement, the content assignment may be invalidated and a different version of content assigned for display.

In embodiments in which the system actively interacts with the viewer to assign content for display to the viewer, the system may additionally interact with the viewer to obtain feedback regarding the value of the content to the viewer. Any of a variety of user interfaces may be used by viewers to provide this feedback. For example, the viewer may provide feedback verbally to help desk personnel (who may then enter the viewer's preferences into a computing device), or may directly input the feedback into a handheld mobile computing device (e.g., a smartphone or tablet), by interacting with the touchscreen of a touch-enabled MV display, or into some other computing device positioned on or near the MV display showing the content. Some embodiments may include gesture recognition software so that the viewer may provide input with gestures. For example, a viewer viewing content being displayed on an MV display may use a "thumbs-up" or "thumbs-down" hand gesture to indicate that the version of content (e.g., an advertisement or coupon) is or is not of interest to the viewer. In other embodiments, the viewer may hold up between one to five fingers to indicate the viewer's level of interest in the version of content being displayed. For example, when a viewer is investigating a product or is in proximity to a store, the viewer may make a feedback gesture, such as a ranking of one to five fingers, to indicate the viewer's interest in that product or store. If the viewer holds up five fingers while in a particular store, the system would recognize that gesture as an indication of very high interest in that store. When the viewer later passes by another MV display, the system would display content related to that store or the products sold in that store, based on the viewer's indication of high interest. The MV display may display prompts and instructions to the viewer for making these gestures. In addition, non-electronic signage may provide the prompts and instructions, such as, e.g., a graphic on the floor to indicate where a viewer should stand to provide gesture inputs.

In some embodiments, the feedback or algorithms used to analyze the viewer's behavior to determine the version of content to display to that viewer may be supplemented by a subsequent analysis, either manually by a human operator or by machine analysis. The system may continually test the use of various forms of content in response to certain behaviors and/or feedback, and measure how the viewers respond. In this manner, the algorithms could be continually improved to prompt desired responses by consumers.

In some embodiments, the system might passively investigate other attributes or interests of viewers. For instance, one or more MV displays may display messaging to a viewer in different languages and the sensing system would detect the viewer's response or lack of response to these different languages in order to determine which language seems to most impact or affect the viewer. The system will subsequently display content in that language to the viewer. This determination of language preference could be made, for example, by analyzing the direction in which the viewer is looking. If the viewer's eyes turn towards the MV display when a certain language is shown, the system may infer that the user speaks that language and would therefore be more responsive to future content displayed in that language. In other embodiments, one or more different types of preferences may be tested and implemented using passive investigation of attributes or interests of viewers. For example, the system may display advertisements containing actors having a variety of characteristics (such as, e.g., age, gender, ethnicity, culture, clothing style, clothing color, clothing brand, etc.) in order to passively investigate which actors draw the more desirable response from the viewer. In some embodiments, the system may actively interact with viewers by enabling viewers to provide inputs to the system (using, e.g., any of the input methods described herein) designating language, cultural, or other preferences.

In some embodiments, other elements may be used in addition to the MV displays in order to further improve the viewer's experience at the venue. For example, the system may activate a visual prompt to a viewer, such as, e.g., one or more of the following: a projector, a lighting system, a gobo lighting system, a special effects system, a prop, a decoration, or a furnishing. The system may also use audible prompts or electronic communication prompts to viewers (e.g., for systems having e-mail addresses and/or phone numbers of viewers, by sending an e-mail or text message to the user). By coordinating the operation of a networked collection of MV displays and other supporting elements, an experience can be created that allows continuity, mutually reinforcing elements, viewer specificity, and other benefits. In addition, the experience can better serve the operational and marketing missions of the mall or other venue by distributing viewers in places that are least crowded, and directing them toward areas with the greatest value potential.

By customizing versions of content to each viewer's general preferences (such as, e.g., language and interests), personal identity information (such as, e.g., the viewer's name or organizational affiliation), visit-specific objectives (such as, e.g., shopping for sunglasses), and visit-specific behavior (such as, e.g., the route and locations visited by the viewer while in the shopping mall), the MV display system can provide more effective communication with the viewer (e.g., influencing more profitable buying choices to the benefit of the mall, and creating a more successful and entertaining visit to the benefit of the shopper).

Retail Example Two. In another example embodiment, the managers of a retail shopping mall may host a promotional game designed to attract shoppers, motivate shoppers to stay at the mall for extended periods of time, and to introduce the shoppers to stores and departments the shoppers may not typically visit. To this end, an MV display system 100 including sensing system 154, MV displays 150, and supporting elements are distributed throughout the mall.

Participants in the game are instructed to seek out the MV displays located in the shopping mall and view the content shown on the MV displays for clues. Content on the MV displays might include, e.g., advertisements, promotions, entertainment, directories, wayfinding, seasonal images, decorative images, and general information. The game could incentivize participants to visit the mall and become more familiar with products and services available there. It may also be used to entertain other people accompanying a shopper but who are not themselves interested in making a purchase at the mall. This could include, for example, reluctant shoppers, such as children, spouses, significant others, and friends who are accompanying a shopper but do not intend to make any purchases themselves. By keeping the non-shoppers entertained, the accompanying shopper may be able to spend a longer period of time in the mall before the non-shoppers become fatigued and pressure the shopper to leave the mall.

In one example game, participants gather clues embedded in the content shown on the MV displays. Since the MV displays simultaneously show different versions of content that vary depending on the viewer's location relative to the MV display, the participants may need to explore the entire viewing area around each MV display so as to look at the MV display from each of multiple viewing zones and thereby gather all of the clues. After each participant has gathered the desired number of clues or has otherwise interacted with the game for the desired amount of time, the participants can be provided with some form of reward, prize, or other benefit. For example, the participant may be provided with a specific time and location that a valuable coupon code will be momentarily revealed on one of the MV displays, or the participant may be rewarded with directions to a special event occurring at the mall.

In another example game, the participant who is first to gather the required number of clues, solve the required number of puzzles, or otherwise perform all of the desired acts will be identified as the winner of the game and provided with some form of reward. For example, an MV display may reveal to the winner a secret code which can be entered into an app or browser on the winner's smartphone. The first to claim the code may be awarded some form of prize, discount, recognition (e.g., display of the winner's name and/or photo on various displays throughout the mall), or other benefit. In other embodiments, the game need not be limited to a single winner, and instead could provide a reward to everyone who completes the game, or to a specific number of players who complete the game.

Instructions, guidance, or other forms of game enhancements may be provided to the participants in the game via one or more different types of communication elements. As described above, the MV displays can be used to display targeted instructions to the participants. In addition, other devices, such as gobos or projectors, may be integrated with the system so as to present additional visual cues to the participants. For example, the controller may be programmed to activate the gobos or projectors to create graphics, imagery, animations, and other content that may be seen on the ground, walls, or other surfaces of the venue. This content may help cue participants where to stand and which direction to travel as they play the game. The content may also provide additional clues or entertainment moments or theming. In some embodiments, an audio component might also be incorporated into the game to enhance the game experience and/or help guide sight-impaired players through the game path.

In some embodiments, such as those targeted at large numbers of players, a variety of approaches may be taken to distribute participants throughout the venue, thereby increasing capacity and preserving entertainment value. For example, it may be desirable to distribute clues and the final secret code such that different players follow different routes through the mall as they play the game, and solve the overall puzzle in a manner that directs them to different locations at different times for revealing the secret code. The game might also be constructed such that once a player is in the right place at the right time to view the secret code, the code will no longer be revealed to any other participants.

In one example, the game includes a registration process in which players register themselves and are assigned a game route and clue locations. The registration process might retrieve known characteristics, preferences, interests, or other state information about each player and utilize that information when generating the route or clues provided to that player. For example, the system may personalize the game so as to guide each player through stores that are believed to be of particular interest to that player. Registration might also include player limitations and capabilities so game sites for these players are easily accessible and visible.

The registration process may be performed in any desired way. For example, participants may register for the game online at home prior to arriving at the mall, or via any of the input methods described herein, such as a smartphone app, mobile device, scanner, reader, kiosk, through store or mall personnel, or through other means.

In some embodiments, the participants are each provided with some form of tracking device which can be used by the system as identification badges to uniquely identify the participants as they move through the mall while playing the game. The tracking device could be, for example, an RFID tag carried by each participant and scanned by RFID readers positioned throughout the mall. Alternatively, the tracking device could be an item printed with a unique identifier graphic that can be detected using an image sensing component of the sensing system. This graphic could be, e.g., a machine-readable code, such as a barcode or QR code, printed on a tag, bracelet, or other item worn or carried by the participants.

In some embodiments, the participants may use other devices as part of the game. For example, each participant may purchase, rent, or borrow an IR emitting wand for interacting with various game elements.

In other embodiments, an object recognition component of the system may be used to detect each player and passively determine their identities or other characteristics, as described above with respect to Retail Example One. The system need not identify participants by name, but can recognize various characteristics of each participant so as to identify them as unique objects travelling through the mall environment. A sensing system may be used to observe player behaviors, actions, mannerisms, and other attributes to refine the game experience.

In a simpler game construct, participants might be arbitrarily directed along different routes depending on the clue they first encounter. This clue will set the participant on one of multiple possible game paths.

In some embodiments, characteristics of the environment may be used to determine the game paths for each player. For example, the sensing system may be programmed to detect which areas of the mall are over-utilized or under-utilized by shoppers, browsers, game participants, and other people in the mall, and the system can direct participants to travel along paths so as to optimize the desired flow of people throughout the mall.

For all the embodiments presented here, the term "display" may describe a single display, multiple displays, an array of displays, arrangements of displays, or even a single projection source (element or pixel), without limitation. In this disclosure, the term "display" is used interchangeably with such terms and concepts as signs, signage, signals, monitors, pixel arrays, strings of pixels, and may also refer to the use of multiple displays in various configurations. The embodiments presented here are meant as examples, and do not exclude alternative embodiments or combinations that fall within the spirit and scope of the present inventions.

Embodiments of the present invention may provide numerous advantages. The targeting of personalized content is challenging in environments in which multiple viewers are viewing the same display. If numerous viewers are within the sightline of a display that is showing content targeted to the interests of one of the viewers, the interests of the other viewers will be neglected. By using MV displays, targeted versions of content can be provided to each viewer based on his or her known characteristics. The effectiveness of targeted content delivery is further enhanced by the tracking and updating of state information about each viewer in an environment to be used to assign the versions of content to uniquely display to each individual viewer on various networked MV displays throughout the environment.

While the invention has been described in terms of particular embodiments and illustrative figures, those of ordinary skill in the art will recognize that the invention is not limited to the embodiments or figures described. For example, in various embodiments described above, the systems are installed in a shopping mall with targeted commercial content for shoppers. In other embodiments, the systems can be provided in any desired location, either indoors or outdoors, and for any type of commercial establishment, venue, presentation, or event, For example, the systems may be provided at recreational or tourism areas, such as, e.g., theme parks, theaters, stadiums, water parks, resorts, cruise ships, casinos, and gaming sites, at educational or enrichment areas, such as, e.g., museums, zoos, aquariums, campuses, cultural districts, national parks, and historic sites, at events, such as, e.g., conventions, at transportation hubs, networks, or infrastructure, such as, e.g., airports, train stations, subway stations, cruise ship terminals, bus stations, highways, and mass transit routes, or at any desired locations, such as, e.g., business parks, parking lots, etc.

The particulars shown herein are by way of example and for purposes of illustrative discussion of the preferred embodiments of the present invention only and are presented in the cause of providing what is believed to be useful and readily understood description of the principles and conceptual aspects of various embodiments of the invention. In this regard, details of the invention may not be described or depicted in the drawings in more detail than is necessary to provide a fundamental understanding of the invention, and/or examples making apparent to those skilled in the art how the several forms of the invention may be embodied in practice.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of operating a plurality of multi-view (MV) displays, wherein each MV display is associated with a corresponding viewing area and is configured to display differentiated visual content to a plurality of viewing zones in the corresponding viewing area, each MV display including a matrix of MV pixels, each MV pixel including a pixel pattern formed of a plurality of pixels and a lens arranged relative to the pixel pattern, each pixel of the pixel pattern emitting light which is collimated by the lens to form a beamlet extending in a defined direction, such that each MV pixel emits a plurality of beamlets originating from the plurality of pixels of the pixel pattern and extending in a plurality of different directions to the plurality of viewing zones in the viewing area, the method comprising:
    calibrating each MV display to mathematically associate beamlets of the MV display with locations in the viewing area using a first sensing system at the MV display and a second sensing system movable within the viewing area, wherein
    i) the first sensing system determines a location of the second sensing system in a viewing zone coordinate system of the viewing area within a sight of the first sensing system;
    ii) patterns are flashed on the MV display to uniquely encode every beamlet of every MV pixel of the MV display;
    iii) the second sensing system images the patterns and determines the beamlet of every MV pixel in a beamlet coordinate system comprising a grid indexed by at least X and Y coordinates of the beamlet;
    iv) the location of the second sensing system in the viewing zone coordinate system and the beamlet of every MV pixel in the beamlet coordinate system are associated;
    v) i)-iv) are repeated for each location of the locations in the viewing area to which the second sensing system is moved; and
    vi) an approximate mathematical relationship is computed to determine a mapping that translates between the viewing zone coordinate system and the beamlet coordinate system of the MV display;
    identifying a first viewer and a second viewer in a first viewing area associated with a first MV display of the plurality of MV displays, for which a first mapping is determined that translates between a first viewing zone coordinate system, in which the plurality of viewing zones are defined, and a first beamlet coordinate system, in which each MV pixel of the first MV display emits the plurality of beamlets in the plurality of different directions;
    determining a first state associated with the first viewer and a third state associated with the second viewer;
    assigning a first visual content for display based on the determined first state associated with the first viewer and assigning a third visual content for display based on the determined third state associated with the second viewer;

using the first mapping, identifying a bundle of beamlets from the MV pixels of the first MV display hitting a first viewing zone associated with the first viewer to display the first visual content to the first viewer;
using the first mapping, identifying another bundle of beamlets from the MV pixels of the first MV display hitting a third viewing zone associated with the second viewer to display the third visual content to the second viewer, wherein the first viewing zone and the third viewing zone are among the plurality of viewing zones in the first viewing area;
controlling color and brightness of each beamlet of the bundle of beamlets to form a first image of the first visual content for the first viewer and controlling color and brightness of each beamlet of the another bundle of beamlets to form a third image of the third visual content for the second viewer, wherein different bundles of beamlets from the MV pixels of the first MV display are respectively directed to the plurality of viewing zones in the first viewing area;
determining the first viewer's presence in a second viewing area associated with a second MV display of the plurality of MV displays, for which a second mapping is determined that translates between a second viewing zone coordinate system, in which the plurality of viewing zones are defined, and a second beamlet coordinate system, in which each MV pixel of the second MV display emits the plurality of beamlets in the plurality of different directions;
determining a transition to a second state associated with the first viewer;
assigning a second visual content for display based on the determined transition to the second state associated with the first viewer;
using the second mapping, identifying a bundle of beamlets from the MV pixels of the second MV display hitting a second viewing zone associated with the first viewer to display the second visual content to the first viewer, wherein the second viewing zone is one of the plurality of viewing zones in the second viewing area; and
controlling color and brightness of each beamlet of the bundle of beamlets to form a second image of the second visual content for the first viewer, wherein different bundles of beamlets from the MV pixels of the second MV display are respectively directed to the plurality of viewing zones in the second viewing area.

2. The method of claim 1, wherein the determining the transition to the second state associated with the first viewer comprises:
identifying a plurality of locations at which the first viewer is detected; and
determining the transition to the second state associated with the first viewer based at least in part on the plurality of locations.

3. The method of claim 2, wherein:
the identifying the plurality of locations at which the first viewer is detected comprises identifying a first commercial establishment in which the first viewer is detected;
the transition to the second state associated with the first viewer comprises a potential interest in the first commercial establishment; and
the displaying, by the second MV display, the second visual content to the second viewing zone associated with the first viewer comprises displaying information regarding a second commercial establishment associated with the first commercial establishment.

4. The method of claim 2, wherein:
each location of the plurality of locations is associated with a corresponding type of product or service;
the transition to the second state associated with the first viewer comprises a potential interest in at least one of the corresponding types of products or services; and
the displaying, by the second MV display, the second visual content to the second viewing zone associated with the first viewer comprises displaying one or more of: information regarding the at least one of the corresponding types of products or services, information regarding a commercial establishment that sells the at least one of the corresponding types of products or services, or directions to the commercial establishment that sells the corresponding types of products or services.

5. The method of claim 1, wherein the determining the transition to the second state associated with the first viewer comprises:
identifying a path of travel followed by the first viewer; and
determining the transition to the second state associated with the first viewer and the path of travel.

6. The method of claim 1, wherein the determining the transition to the second state associated with the first viewer comprises:
identifying an object moving with the first viewer; and
determining the transition to the second state based on the identified object.

7. The method of claim 6, wherein:
the identifying the object moving with the first viewer comprises identifying a third viewer moving with the first viewer; and
the determining the transition to the second state based on the identified object comprises determining the transition to the second state based on the identification of the third viewer.

8. The method of claim 1, wherein the determining the transition to the second state associated with the first viewer comprises:
determining a first estimated speed at which the first viewer travels past a first location; and
determining the transition to the second state based on the first estimated speed.

9. The method of claim 8, wherein:
the determining the first estimated speed at which the first viewer travels past the first location comprises determining the first estimated speed at which the first viewer travels past a commercial establishment associated with a first type of product or service; and
the determining the transition to the second state based on the first estimated speed comprises determining a potential interest of the first viewer in the first type of product or service based on the first estimated speed at which the first viewer travels past the commercial establishment.

10. The method of claim 8, wherein:
the determining the first estimated speed at which the first viewer travels past the first location comprises determining the first estimated speed at which the first viewer travels past an advertisement for (i) a first product or service or (ii) a first venue;
the determining the transition to the second state based on the first estimated speed comprises determining a potential interest of the first viewer in the (i) first product or service or (ii) first venue based on the first estimated speed at which the first viewer travels past the advertisement; and the assigning the second visual content for display based on the determined transition to the second state associated with the first viewer comprises assigning the second visual content for display based on the determined potential interest of the first viewer in the (i) first product or service or (ii) first venue.

11. The method of claim 1, wherein identifying the first viewer in the first viewing area comprises:
operating a sensing system to detect a first feature of the first viewer.

12. The method of claim 11, wherein operating the sensing system to detect the first feature of the first viewer comprises:
capturing an image of the first viewer with an image sensing component of the sensing system; and
utilizing a computer vision system to identify from the image the first feature of the first viewer.

13. The method of claim 12, wherein utilizing the computer vision system to identify from the image the first feature of the first viewer comprises one or more of the following:
utilizing a facial recognition system to determine an identity of the first viewer;
utilizing the computer vision system to determine characteristics of clothing worn by the first viewer; or
utilizing the computer vision system to identify an object carried by the first viewer.

14. The method of claim 11, wherein operating the sensing system to detect the first feature of the first viewer comprises:
detecting with the sensing system a tracking device carried by the first viewer, wherein the tracking device provides identification information associated with the first viewer.

15. The method of claim 14, wherein detecting the tracking device carried by the first viewer comprises one or more of the following:
detecting with an RFID reader an RFID tag carried by the first viewer, wherein the RFID tag transmits identification information associated with the first viewer; or
capturing an image of the tracking device with an image sensing component of the sensing system, wherein the image includes an identifier graphic, and determining second identification information associated with the identifier graphic.

16. The method of claim 1, wherein identifying the first viewer in the first viewing area comprises:
receiving an input from the first viewer, the input comprising identity information for the first viewer.

17. The method of claim 16, wherein receiving the input from the first viewer comprises one or more of:
receiving a communication from a mobile computing device, the communication including identity information for the first viewer; or
receiving the input via a user interface of a computing device, wherein the user interface prompts the first viewer to enter identity information into the user interface.

18. The method of claim 1, further comprising:
retrieving from a database one or more characteristics associated with the identified first viewer.

19. The method of claim 1, further comprising:
receiving information relating to the first viewer based on usage by the first viewer of a credit card or loyalty membership.

20. The method of claim 1, further comprising:
activating a visual prompt based on the determined transition to the second state associated with the first viewer, wherein the visual prompt comprises one or more of the following: a projector, a lighting system, a gobo lighting system, a special effects system, a prop, a decoration, or a furnishing.

21. A display system, comprising:
a first multi-view (MV) display configured to simultaneously display a first visual content visible from a first viewing zone and a second visual content visible from a second viewing zone, wherein the first visual content is not visible from the second viewing zone and the second visual content is not visible from the first viewing zone, the first MV display including a matrix of MV pixels, each MV pixel including a pixel pattern formed of a plurality of pixels and a lens arranged relative to the pixel pattern, each pixel of the pixel pattern emitting light which is collimated by the lens to form a beamlet extending in a defined direction, such that each MV pixel emits a plurality of beamlets originating from the plurality of pixels of the pixel pattern and extending in a plurality of different directions to the first viewing zone and the second viewing zone;

a second MV display configured to simultaneously display a third visual content visible from a third viewing zone and a fourth visual content visible from a fourth viewing zone, wherein the third visual content is not visible from the fourth viewing zone and the fourth visual content is not visible from the third viewing zone, the second MV display including a matrix of MV pixels, each MV pixel including a pixel pattern formed of a plurality of pixels and a lens arranged relative to the pixel pattern, each pixel of the pixel pattern emitting light which is collimated by the lens to form a beamlet extending in a defined direction, such that each MV pixel emits a plurality of beamlets originating from the plurality of pixels of the pixel pattern and extending in a plurality of different directions to the third viewing zone and the fourth viewing zone; wherein the first MV display is calibrated to display the first visual content visible from the first viewing zone relative to the first viewing zone coordinate system, and to display the second visual content visible from the second viewing zone of the first MV display relative to the first viewing zone coordinate system;

the second MV display is calibrated to display the third visual content visible from the third viewing zone relative to the second viewing zone coordinate system, and to display the fourth visual content visible from the fourth viewing zone of the second MV display relative to the second viewing zone coordinate system; and each of the first MV display and the second MV display is calibrated to mathematically associate beamlets of the MV display with locations in a corresponding viewing area associated with the MV display using a first sensing system at the MV display and a second sensing system movable within the corresponding viewing area, wherein i) the first sensing system determines a location of the second sensing system in a viewing zone coordinate system of the viewing area within a sight of the first sensing system;

ii) patterns are flashed on the MV display to uniquely encode every beamlet of every MV pixel of the MV display;
iii) the second sensing system images the patterns and determines the beamlet of every MV pixel in a beamlet coordinate system comprising a grid indexed by at least X and Y coordinates of the beamlet;
iv) the location of the second sensing system in the viewing zone coordinate system and the beamlet of every MV pixel in the beamlet coordinate system are associated;
v) i)-iv) are repeated for each location of the locations in the viewing area to which the second sensing system is moved; and
vi) an approximate mathematical relationship is computed to determine a mapping that translates between the viewing zone coordinate system and the beamlet coordinate system of the MV display; and
a sensing system configured to detect one or more features of a first viewer in the first viewing zone and one or more features of a second viewer in the second viewing zone; and
a system controller configured (a) to determine a first mapping that translates between a first viewing zone coordinate system, in which the first and second viewing zones of the first MV display are defined, and a first beamlet coordinate system, in which each MV pixel of the first MV display emits the plurality of beamlets in the plurality of different directions, and to determine a second mapping that translates between a second viewing zone coordinate system, in which the third and fourth viewing zones of the second MV display are defined, and a second beamlet coordinate system, in which each MV pixel of the second MV display emits the plurality of beamlets in the plurality of different directions, (b) to maintain state information relating to the first viewer and the second viewer, (c) to assign the first visual content for display to the first viewing zone of the first MV display based on the state information relating to the first viewer and to assign the second visual content for display to the second viewing zone of the first MV display based on the state information relating to the second viewer, and (d) to determine a change in the state information relating to the first viewer and assign the third visual content for display to the first viewer in the third viewing zone of the second MV display based on the changed state information, wherein
the assigning in (c) includes using the first mapping to identify a bundle of beamlets from the MV pixels of the first MV display hitting the first viewing zone to display the first visual content to the first viewer and using the first mapping to identify another bundle of beamlets from the MV pixels of the first MV display hitting the second viewing zone to display the second visual content to the second viewer, and
the displaying in (d) includes using the second mapping to identify a bundle of beamlets from the MV pixels of the second MV display hitting the third viewing zone to display the third visual content to the first viewer.

22. The display system of claim 21, wherein:
the system controller is configured to determine that the first viewer has moved to the third viewing zone and to assign the third visual content for display to the first viewer on the second MV display based on the state information relating to the first viewer.

23. The display system of claim 21, wherein:
the system controller is configured to determine a first change in the state information relating to the first viewer and to assign the third visual content for display to the first viewer on the second MV display based on the first change in the state information relating to the first viewer.

24. The display system of claim 21, wherein the system controller comprises:
a central system controller;
a first local MV display controller coupled to the first MV display; and
a second local MV display controller coupled to the second MV display.

25. The display system of claim 24, wherein:
the central system controller is configured to maintain the state information relating to the first viewer and to assign the first visual content for display to the first viewing zone on the first MV display; and
the first local MV display controller is configured to receive the first visual content from the central system controller, generate video signals representing the first visual content, and transmit the video signals representing the first visual content to the first MV display.

26. The display system of claim 21, wherein:
the sensing system defines a central coordinate system;
the first MV display is calibrated to display the first visual content visible from the first viewing zone relative to the central coordinate system, and to display the second visual content visible from the second viewing zone of the first MV display relative to the central coordinate system; and
the second MV display is calibrated to display the third visual content visible from the third viewing zone relative to the central coordinate system, and to display the fourth visual content visible from the fourth viewing zone of the first MV display relative to the central coordinate system.

27. The display system of claim 21, further comprising a third MV display and a fourth MV display, wherein the system controller comprises:
a first group controller coupled to the first MV display and the second MV display; and
a second group controller coupled to the third MV display and the fourth MV display.

28. The display system of claim 27, wherein the sensing system comprises:
a first local sensing system coupled to the first group controller; and
a second local sensing system coupled to the second group controller.

* * * * *